(12) United States Patent
Baumback et al.

(10) Patent No.: US 8,286,176 B1
(45) Date of Patent: Oct. 9, 2012

(54) OPTIMIZING RESOURCE CONFIGURATIONS

(75) Inventors: Mark S. Baumback, Seattle, WA (US);
David William Bettis, Seattle, WA (US);
Jonathan A. Jenkins, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 993 days.

(21) Appl. No.: 12/240,945

(22) Filed: Sep. 29, 2008

(51) Int. Cl.
*G06F 15/173* (2006.01)

(52) U.S. Cl. ........................................ 718/104; 709/221

(58) Field of Classification Search .................. None
See application file for complete search history.

(56) References Cited

U.S. PATENT DOCUMENTS

| | | | |
|---|---|---|---|
| 5,649,185 A * | 7/1997 | Antognini et al. ................ | 726/2 |
| 5,664,106 A | 9/1997 | Caccavale | |
| 5,819,033 A | 10/1998 | Caccavale | |
| 6,185,598 B1 | 2/2001 | Farber et al. | |
| 6,192,051 B1 | 2/2001 | Lipman et al. | |
| 6,438,592 B1 | 8/2002 | Killian | |
| 6,473,804 B1 | 10/2002 | Kaiser et al. | |
| 6,553,419 B1 | 4/2003 | Ram | |
| 6,560,610 B1 | 5/2003 | Eatherton et al. | |
| 6,633,324 B2 * | 10/2003 | Stephens, Jr. .............. | 348/14.09 |
| 6,698,013 B1 | 2/2004 | Bertero et al. | |
| 6,978,418 B1 | 12/2005 | Bain et al. | |
| 7,009,943 B2 * | 3/2006 | O'Neil .......................... | 370/260 |
| 7,065,496 B2 | 6/2006 | Subbloie et al. | |
| 7,085,825 B1 | 8/2006 | Pishevar et al. | |
| 7,107,273 B2 | 9/2006 | Ohata et al. | |
| 7,120,871 B1 | 10/2006 | Harrington | |
| 7,146,560 B2 | 12/2006 | Dang et al. | |
| 7,269,657 B1 | 9/2007 | Alexander et al. | |
| 7,320,131 B1 | 1/2008 | O'Toole, Jr. | |
| 7,343,399 B2 | 3/2008 | Hayball et al. | |
| 7,502,836 B1 | 3/2009 | Menditto et al. | |
| 7,581,224 B2 | 8/2009 | Romero | |
| 7,624,169 B2 | 11/2009 | Lisiecki et al. | |
| 7,685,270 B1 | 3/2010 | Vermeulen et al. | |
| 7,698,418 B2 | 4/2010 | Shimada et al. | |
| 7,739,400 B2 | 6/2010 | Lindbo et al. | |
| 7,748,005 B2 | 6/2010 | Romero et al. | |

(Continued)

OTHER PUBLICATIONS

Al-Fares, M. et al., A Scalable, Commodity Data Center Network Architecture, SIGCOMM '08 Proceedings, Aug. 17, 2008, pp. 63-74, 66-68, 70-71, Seattle, WA.

(Continued)

*Primary Examiner* — Eric Coleman
(74) *Attorney, Agent, or Firm* — Knobbe, Martens, Olson & Bear, LLP

(57) ABSTRACT

Systems and methods for monitoring the performance associated with fulfilling resource requests and determining optimizations for improving such performance are provided. A processing device obtains and processes performance metric information associated with processing a request corresponding to a set of resources. The processing device uses the processed performance metric information to determine a resource configuration to be associated with the set of resources. In some embodiments, in making such a determination, the processing device assesses performance metric information collected and associated with subsequent requests corresponding to the content associated with the set of resources and using each of a variety of alternative resource configurations. The processing device may also consider a number of factors, including performance selection criteria obtained from an original content provider. Aspects of systems and methods for generating recommendations to use a particular resource configuration to process a subsequent request corresponding to the content associated with the set of resources are also provided.

71 Claims, 10 Drawing Sheets

U.S. PATENT DOCUMENTS

| | | | |
|---|---|---|---|
| 7,752,301 B1 | 7/2010 | Maiocco et al. | |
| 7,756,032 B2 | 7/2010 | Feick et al. | |
| 7,773,596 B1 | 8/2010 | Marques | |
| 7,865,594 B1 | 1/2011 | Baumback et al. | |
| 7,925,782 B2 | 4/2011 | Sivasubramanian et al. | |
| 7,937,456 B2* | 5/2011 | McGrath | 709/220 |
| 7,961,736 B2* | 6/2011 | Ayyagari | 370/395.3 |
| 7,962,597 B2 | 6/2011 | Richardson et al. | |
| 8,051,166 B1 | 11/2011 | Baumback et al. | |
| 2002/0112049 A1 | 8/2002 | Elnozahy et al. | |
| 2002/0116491 A1 | 8/2002 | Boyd et al. | |
| 2002/0138443 A1* | 9/2002 | Schran et al. | 705/64 |
| 2002/0150276 A1 | 10/2002 | Chang | |
| 2002/0194382 A1 | 12/2002 | Kausik et al. | |
| 2003/0005111 A1 | 1/2003 | Allan | |
| 2003/0149581 A1 | 8/2003 | Chaudhri et al. | |
| 2003/0221000 A1 | 11/2003 | Cherkasova et al. | |
| 2004/0049579 A1 | 3/2004 | Ims et al. | |
| 2004/0064293 A1 | 4/2004 | Hamilton et al. | |
| 2004/0064558 A1 | 4/2004 | Miyake | |
| 2004/0083307 A1 | 4/2004 | Uysal | |
| 2005/0038967 A1 | 2/2005 | Umbehocker et al. | |
| 2005/0086645 A1* | 4/2005 | Diao et al. | 717/127 |
| 2005/0157712 A1 | 7/2005 | Rangarajan et al. | |
| 2005/0171959 A1 | 8/2005 | Deforche et al. | |
| 2005/0273507 A1 | 12/2005 | Yan et al. | |
| 2006/0069808 A1 | 3/2006 | Mitchell et al. | |
| 2006/0209701 A1 | 9/2006 | Zhang et al. | |
| 2006/0218304 A1 | 9/2006 | Mukherjee et al. | |
| 2006/0251339 A1 | 11/2006 | Gokturk et al. | |
| 2006/0282758 A1 | 12/2006 | Simons et al. | |
| 2007/0016736 A1 | 1/2007 | Takeda et al. | |
| 2007/0086429 A1 | 4/2007 | Lawrence et al. | |
| 2007/0245010 A1* | 10/2007 | Arn et al. | 709/223 |
| 2007/0250560 A1 | 10/2007 | Wein et al. | |
| 2008/0065724 A1 | 3/2008 | Seed et al. | |
| 2008/0065745 A1 | 3/2008 | Leighton et al. | |
| 2008/0086559 A1 | 4/2008 | Davis et al. | |
| 2008/0172488 A1 | 7/2008 | Jawahar et al. | |
| 2008/0183721 A1 | 7/2008 | Bhogal et al. | |
| 2008/0215755 A1 | 9/2008 | Farber et al. | |
| 2009/0122714 A1 | 5/2009 | Kato | |
| 2009/0248893 A1 | 10/2009 | Richardson et al. | |
| 2009/0327517 A1 | 12/2009 | Sivasubramanian et al. | |
| 2011/0252143 A1 | 10/2011 | Baumback et al. | |

OTHER PUBLICATIONS

Greenberg, A. et al., Networking the Cloud, 29th IEEE International Conference on Distributed Computing Systems (ICDCS 2009), Jun. 22-26, 2009 [online] retrieved from the Internet on Mar. 10, 2011: http://www.cse.ohio-state.edu/icdcs2009/Keynote_files/greenberg-keynote.pdf, pp. 1-45.

Greenberg, A. et al., Towards a Next Generation Data Center Architecture: Scalability and Commoditization, SIGCOMM '08: Proceedings of the 2008 SIGCOMM Conference and Co-Located Workshops NSDR '08, WOSN '08, MOBIARCH '08, NETECON '08, & Presto '08, Seattle, WA, Aug. 17-28, 2008, ACM, Aug. 17, 2008, pp. 57-62, New York, NY.

Greenberg, A. et al., VL2: A scalable and flexible data center network, SIGCOMM '09, Proceedings of the ACM SIGCOMM 2009 Conference on Data Communication, Aug. 17, 2009, vol. 39, Issue 4, pp. 51-62.

Mysore, R.N. et al., Portland: a scalable fault-tolerant layer 2 data center network fabric, SIGCOMM '09, Proceedings of the ACM SIGCOMM 2009 Conference on Data Communication, Aug. 17, 2009, pp. 39-50.

\* cited by examiner

OPTIMIZING RESOURCE CONFIGURATIONS

RELATED APPLICATIONS

This application is related to the following co-pending applications:

U.S. patent application Ser. No. 12/240,583, entitled "Monitoring Performance and Operation of Data Exchanges" and filed on Sep. 29, 2008;

U.S. patent application Ser. No. 12/240,863, entitled "Monitoring Domain Allocation Performance" and filed on Sep. 29, 2008;

U.S. patent application Ser. No. 12/240,926 entitled "Managing Network Data Display" and filed on Sep. 29, 2008;

U.S. patent application Ser. No. 12/240,881, entitled "Managing Resource Consolidation Configurations" and filed on Sep. 29, 2008;

U.S. patent application Ser. No. 12/240,659, entitled "Optimizing Content Management" and filed on Sep. 29, 2008; and U.S. patent application Ser. No. 12/240,740, entitled "Service Provider Optimization of Content Management" and filed on Sep. 29, 2008.

U.S. patent application Ser. Nos. 12/240,583; 12/240,863; 12/240,926; 12/240,881; 12/240,659; and 12/240,740 are incorporated by reference herein.

BACKGROUND

Generally described, computing devices and communication networks may be utilized to exchange information. In a common application, a computing device may request content from another computing device via a communication network. For example, a user at a personal computing device may utilize a browser application to request a web page from a server computing device via the Internet. In such embodiments, the user computing device may be referred to as a client computing device and the server computing device may be referred to as a content provider.

Content providers are generally motivated to provide requested content to client computing devices often with consideration of efficient transmission of the requested content to the client computing device and/or consideration of a cost associated with the transmission of the content. Additionally, the content requested by the client computing devices may have a number of components, which may require further consideration of latencies associated with delivery of the individual components as well as the originally requested content as a whole.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser application, typically processes embedded resource identifiers to generate requests for the content. Often the resource identifiers associated with the embedded resource reference a computing device associated with the content provider such that the client computing device would transmit the request for the additional resources to the referenced computing devices. Accordingly, in order to satisfy a content request, the content provider(s) (or any service provider on behalf of the content provider(s)) would provide client computing devices data associated with the Web page and/or data associated with the embedded resources.

Some content providers attempt to facilitate the delivery of requested content, such as Web pages and/or resources identified in Web pages, through the utilization and distribution of content at a number of geographically diverse data centers. Data centers typically maintain a number of computing devices for maintaining content in a variety of geographically remote locations. By distributing content among more than one data center, either by storing content at a particularly designated location or by storing content at multiple locations, content providers seek to efficiently transmit requested content to client computing devices, which are also typically located in a variety of geographic locations.

Alternatively or additionally, some content providers attempt to facilitate the delivery of requested content through the utilization of a content delivery network ("CDN") service provider. A CDN service provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

Traditionally, a number of methodologies exist which measure the performance associated with the exchange of data such as in the environment described above. For example, some methodologies provide for limited measurement of performance metrics associated with network side processing of a content request. Other methodologies allow for limited measurement of performance metrics associated with the content request measured from the browser side.

BRIEF DESCRIPTION OF THE DRAWINGS

Many of the attendant advantages and aspects of the present disclosure will become more readily appreciated as the same become better understood by reference to the following detailed description, when taken in conjunction with the accompanying drawings, wherein.

DETAILED DESCRIPTION

Figure 1:
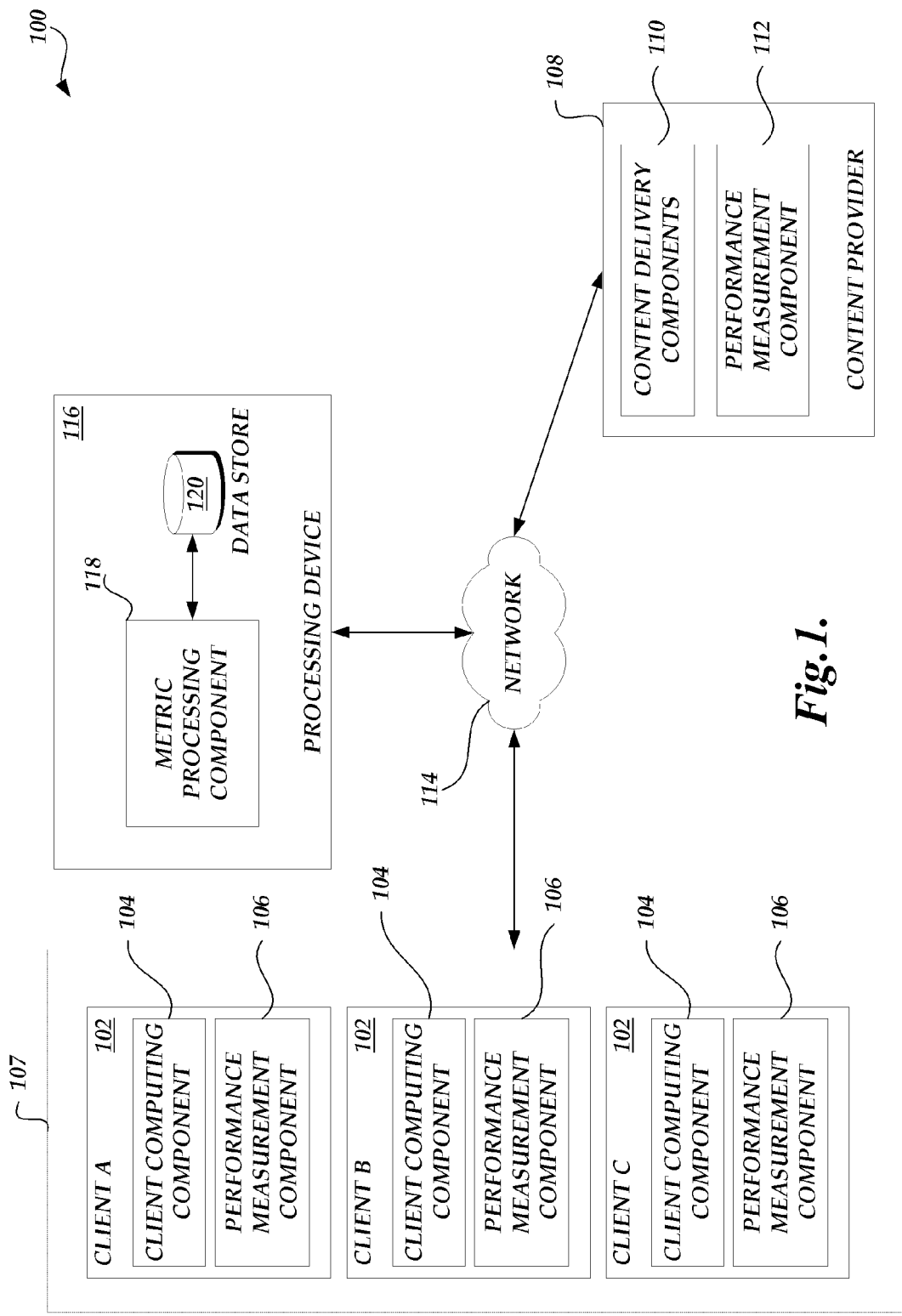
FIG. 1 is a block diagram illustrative of a performance measurement system including a number of client computing devices, a content provider, a processing device, and a number of service providers.

Generally described, the present disclosure is directed to monitoring the performance and processing of data exchanges between client computing devices and server computing devices. Specifically, aspects of the disclosure will be described with regard to monitoring a data exchange involving a request by a client computing device for an original resource and a set of corresponding embedded resources and dynamically identifying one or more resource configurations to be utilized in conjunction with processing a subsequent request corresponding to the content associated with the set of embedded resources. In one embodiment, identifying one or more resource configurations is based on a display location associated with a subset of the embedded resources to be located on a visible portion of a display. Performance data can then be used to assess performance related to processing of the various client requests corresponding to the content associated with the set of embedded resources. Additionally, the processed performance data can be used to determine whether to recommend a particular resource configuration to improve performance of further subsequent client requests for the corresponding content.

Traditionally, network servers can collect latency information associated with a server's processing of a client request for a resource. For example, network servers can measure a time associated with processing an incoming client request, identifying/obtaining the requested resource, and initiating the transmission of the resource responsive to the client request. Additionally, client computing devices can collect latency information associated with the client computing device's initiation of a resource request and receipt of the resource responsive to the request. Aspects of the present disclosure, which will be described further below, are directed to identifying and providing additional information to improve the performance assessment related to the processing of a client request for one or more resources and to dynamically identifying and evaluating modifications to the original request, original resource, and/or any embedded resources.

Even further, traditionally, client computing device hardware and software, including browsers, operating systems, network stacks, and routers, may be configured to limit or otherwise restrict network traffic according to set rules. For example, Web browsers may attempt to place limits on the number of simultaneous connections that may be initiated by or maintained between the browser and any particular content provider computing device. In many browsers, connections may be limited by domain name, such that, for example, a client computing device may maintain a threshold number of simultaneous connections to a given domain name. In accordance with further aspects of the present disclosure, which will also be described further below, the performance assessment associated with processing resource requests will take such limitations or restrictions into consideration. Although various aspects of the disclosure will be described with regard to illustrative examples and embodiments, one skilled in the art will appreciate that the disclosed embodiments and examples should not be construed as limiting.

FIG. 1 is a block diagram illustrative of a performance measurement system 100 for monitoring the performance and processing of data exchanges, and for specifically monitoring the performance associated with transmission and display of each resource in a subset of requested resources. As illustrated in FIG. 1, the performance measurement system 100 includes a number of client computing devices 102 (generally referred to as clients) for requesting content from a content provider. As illustrated in FIG. 1, each client computing device 102 includes a client computing component 104 for requesting content from network resources in the form of an originally requested resource that may include identifiers to two or more embedded resources that need to be requested. As will be described in greater detail below, the client computing component 104 also identifies performance metrics obtained by client computing devices and/or components, such as browser software applications. Additionally, the client computing device 102 includes a performance measurement component 106 that identifies additional performance metrics associated with the client request, such as network level performance data including, for example, timing of receipt of first and last network packets of data for fulfilling the original resource request and each embedded resource request. In one embodiment, the performance measurement component 106 works in conjunction with the client computing component 104 to collect performance metric information such as from an operating system or a data file.

As illustrated in FIG. 1, the client computing component 104 and performance measurement component 106 are executed on each client computing device 102. Alternatively, the client computing component 104 may not be configured, or is otherwise incapable of, obtaining or providing some or all of the performance metric information described herein. In such an embodiment, the client computing component 104 may function with a reduced or limited capacity. In still a further embodiment, the client computing component 104 may function in conjunction with a separate communication software application (e.g., a browser software application) to provide the combined functionality described for the client computing component 104. For example, the client computing component could correspond to a stand alone software application, plugin, script, and the like. Additionally, although each client computing device 102 is illustrated as having a separate performance measurement component 106, in an alternative embodiment, the performance measure component 106 may be shared by one or more client computing devices.

In an illustrative embodiment, the client computing devices 102 may correspond to a wide variety of computing devices including personal computing devices, laptop computing devices, hand-held computing devices, terminal computing devices, mobile devices, wireless devices, various electronic devices and appliances and the like. As also illustrated in FIG. 1, the client computing devices 102 are considered to be logically grouped, as represented generally by client 107, regardless of whether the client computing devices are physically separate and geographically distributed throughout the communication network 114. In this regard, the client computing devices 102 may each communicate directly or indirectly with other computing devices over network 114, such as a wide area network or local network. Additionally, one skilled in the relevant art will appreciate that client 107 can be associated with various additional computing devices/components including, but not limited to, content and resource administrative components, DNS resolvers, scheduling devices/components, and the like.

Each of the client computing devices 102 can accordingly include necessary hardware and software components for establishing communications over the network 114. For example, the client computing devices 102 may include networking components and additional software applications that facilitate communications via the Internet or an intranet. As previously described, the client computing device 102 may include an additional, separate browser software application. The client computing devices 102 may also be associated with, or otherwise include, other computing components, such as proxy applications, for further facilitating communications via the Internet or an intranet. As previously described, the client computing components 104 may each function as a browser software application for requesting content from a network resource. Additionally, in an illustrative embodiment, the performance measurement component 106 of the client computing device 102 may function as a proxy application for managing browser application content requests to the network resource. In other embodiments, the client computing devices 102 may be otherwise associated with an external proxy application, as well as any other additional software applications or software services, used in conjunction with requests for content.

With continued reference to FIG. 1 and as set forth generally above, the performance measurement system 100 may include a content provider 108 in communication with the one or more client computing devices 102 via the communication network 114. The content provider 108 may include a number of content delivery components 110, such as a Web server component and associated storage component corresponding to one or more server computing devices for obtaining and processing requests for content (such as Web pages) from the client computing devices 102. The content provider 108 can further include a performance measurement component 112 for measuring performance metrics, such as a time associated with processing an incoming client request, identifying/obtaining the requested resource, and initiating the transmission of the resource responsive to the client request. One skilled in the relevant art will appreciate that the content provider 108 can include or otherwise be associated with various additional computing resources, including, but not limited to, additional computing devices for administration of content and resources, DNS name servers, interfaces for obtaining externally provided content (e.g., advertisements, Web services, etc.), and the like. Although the performance measurement system 100 is illustrated in a client-server configuration, one skilled in the relevant art will appreciate that the performance measurement system 100 may be implemented in a peer-to-peer configuration as well.

With yet further continued reference to FIG. 1, the performance measurement system 100 may further include a processing device 116 for collecting and aggregating performance data related to the processing of client requests. The processing device 116 can also be used to assess the collected performance data and to determine if modifications to the original resource and/or embedded resources should be made to improve performance for subsequent client requests for the corresponding content associated with the original resource and/or embedded resources.

As illustrated in FIG. 1, the processing device 116 is in communication with the one or more client computing devices 102 and the content provider 108 via communication network 114. Additionally, as will be further described below, the processing device 116 may include a metric processing component 118 for the collection and aggregation of performance data from the client computing devices 102 and content provider 108, or any other computing devices, as well as for the assessment of performance data. Specifically, in one embodiment, the client computing components 104 and performance measurement components 106 associated with client computing devices 102 provide performance metric information to the metric processing component 118, while the performance measurement component 112 of the content provider 108 provides performance metric information to the metric processing component 118. The processing device 116 may further include a local data store 120 for storing the received performance data. It will be appreciated by one skilled in the art and others that metric processing component 118 and data store 120 may correspond to multiple devices/components and/or may be distributed.

With continued reference to FIG. 1, the performance measurement system 100 can further include a set 122 of one or more service providers, such as CDN service provider 124, storage service provider 126, application service provider 128, transit service provider 130, and a number of other service providers 132. As also illustrated in FIG. 1, the set 122 of one or more service providers is considered to be logically grouped, as represented generally by set 122, regardless of whether the service providers are physically separate and geographically distributed throughout the communication network 114. In this regard, each service provider in the set 122 can communicate directly or indirectly with other computing devices, such as client computing devices 102 and content providers 108, over communication network 114, such as a wide area network or local network.

The CDN service provider 124 illustrated in FIG. 1 corresponds to a logical association of one or more computing devices (not shown) associated with a CDN service provider. Specifically, the CDN service provider 124 can include a number of Point of Presence ("POP") locations that correspond to nodes on the communication network 114. The CDN POPs will typically be geographically distributed throughout the communication network 114 in a manner to best serve various demographics or other characteristics associated with client computing devices 102. Each CDN POP includes a DNS component made up of a number of DNS server computing devices for resolving DNS queries from the client computers 102. Each CDN POP also includes a resource cache component made up of a number of cache server computing devices for storing resources from content providers and transmitting various requested resources to various client computers. The DNS components and the resource cache components may further include additional software and/or hardware components that facilitate communications including, but not limited to, load balancing or load sharing software/hardware components.

With continued reference to FIG. 1, the storage service provider 126 also corresponds to a logical association of one or more computing devices (not shown) associated with a storage provider. As with the CDN service provider 124, the storage service provider 126 can also include a number of Points of Presence ("POP") locations that correspond to nodes on the communication network 114. In one illustrative embodiment, these storage POPs correspond to data centers which can be used to provide storage system facilities and maintain resources on behalf of a content provider. Accordingly, each storage POP, or data center, can include a number of components for, amongst other things, storing and providing resources on behalf of a content provider. Such resources can include text, images, sounds, videos, animations, as well as user profile information, applications, web services, and the like. In addition, the storage POPs, or data centers, will typically be geographically distributed throughout the communication network 114 in a manner to best serve various demographics of client computing devices 102.

The application service provider 128 illustrated in FIG. 1 also corresponds to a logical association of one or more computing devices (not shown) associated with an application service provider. As with the CDN and storage service providers 124 and 126, the application service provider 128 can also include a number of Points of Presence ("POP") locations that correspond to nodes on the communication network 114. Each application POP includes a network computing (or cloud computing) component (NCC) for hosting applications, such as data streaming applications, via a number of instances of a virtual machine, generally referred to as an instance of an NCC. One skilled in the relevant art will appreciate that NCCs would include physical computing device resources and software to provide the multiple instances of a virtual machine or to dynamically cause the creation of instances of a virtual machine. Each application POP may also include a storage component made up of a number of storage devices for storing resources from content providers which will be processed by an instance of an NCC and transmitted to various client computers. In addition, the application POPs will typically be geographically distributed throughout the communication network 114 in a manner to best serve various demographics of client computing devices 102.

With continued reference to FIG. 1, the transit service provider 130 also corresponds to a logical association of one or more computing devices (not shown) associated with a transit service provider. A transit service provider provides computing devices and/or services, such as routers, bridges, gateways, network access services, and the like, for establishing network communications over or between networks. In one illustrative embodiment, the transit service provider 130 may be an Internet service provider (ISP). As with the foregoing service providers, the transit service provider 130 can also include a number of Points of Presence ("POP") locations that correspond to nodes on the communication network 114. In addition, the transit POPs will typically be geographically distributed throughout the communication network 114 in a manner to best serve various demographics of client computing devices 102.

In further reference to FIG. 1, the performance measurement system 100 can include a number of other service providers 132 for use in hosting, processing, or enabling the transmission of content. Moreover, it will be appreciated by one skilled in the relevant art that a service provider may offer any one or more of the services described above as being associated with CDN, storage, application, and transit service providers. For example, a data center may provide both traditional storage services, as well as network computing services.

As will be described further below, the performance measurement system 100 may use and evaluate performance of any one or more of the service providers 124, 126, 128, 130, 132 in hosting and/or processing content on behalf of the content provider 108 and/or enabling the transmission of such content. In one illustrative embodiment, the performance measurement system 100 may evaluate the performance associated with providing a Web page to a client computing device 102 using a particular CDN service provider to host and/or process at least a portion of the associated content for the Web page. In another illustrative embodiment, the performance measurement system 100 may evaluate the performance of each of a number of data centers for storing and providing content for a particular Web page. In yet another illustrative embodiment, the performance measurement system 100 may evaluate the performance associated with use of a particular data center connected using a particular transit provider to provide content to a client computing device on behalf of a content provider.

One skilled in the relevant art will also appreciate that the components and configurations provided in FIG. 1 are illustrative in nature. Accordingly, additional or alternative components and/or configurations, especially regarding additional components, systems and subsystems for facilitating communications may be utilized.

Figure 2:
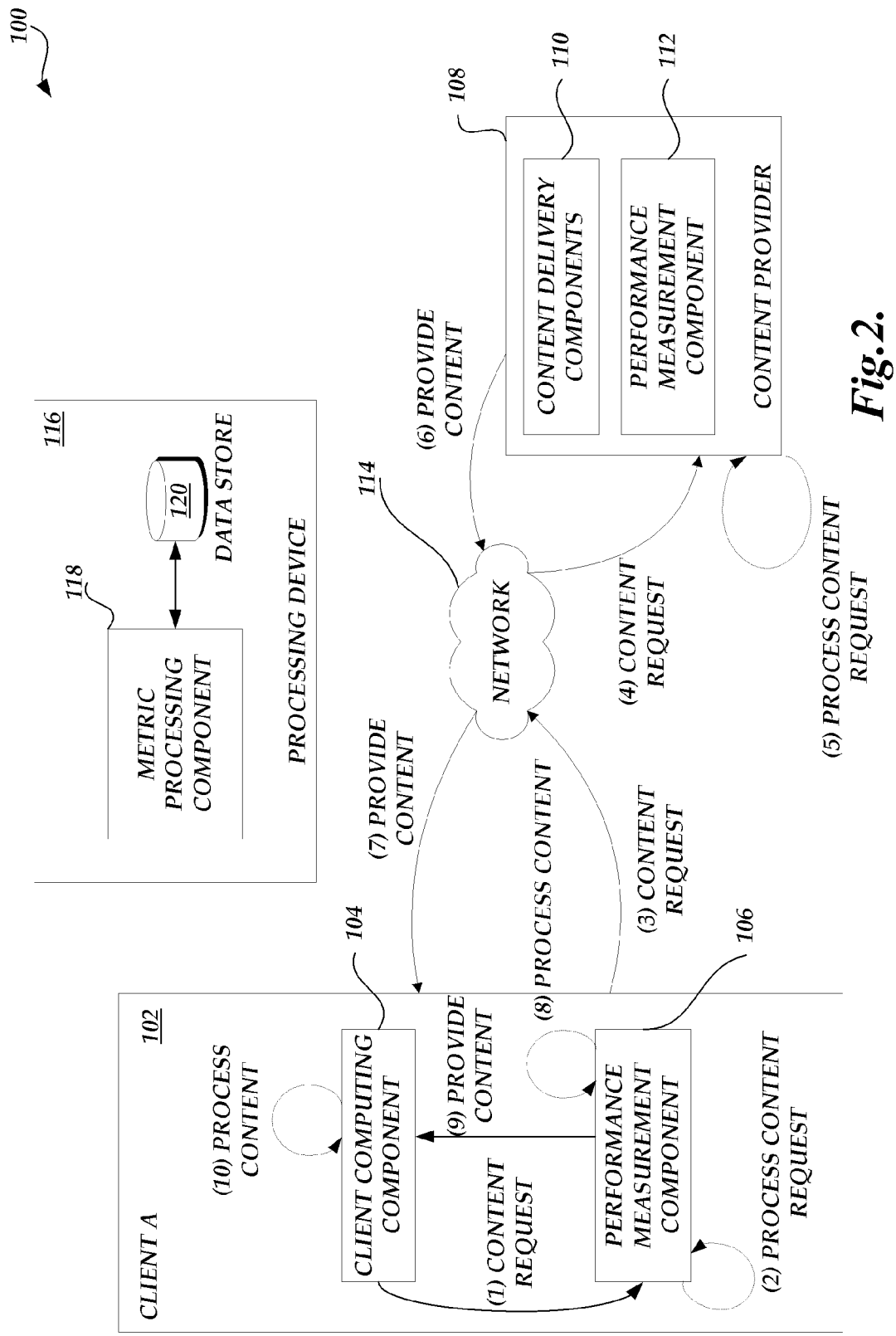
FIG. 2 is a block diagram of the performance measurement system of FIG. 1 illustrating the process of monitoring and fulfilling resource requests.
Figure 3:
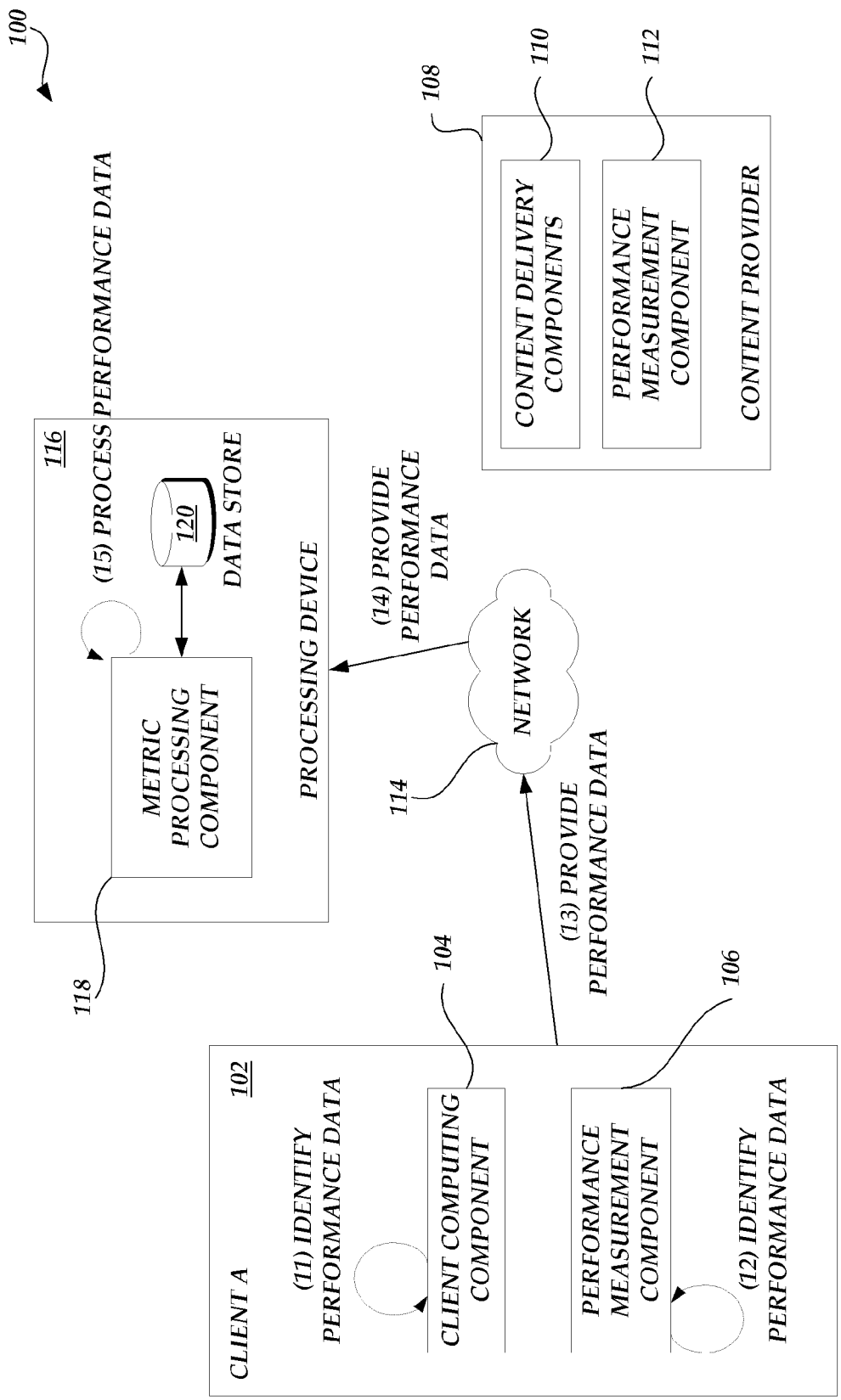
FIG. 3 is a block diagram of the performance measurement system of FIG. 1 illustrating the process of identifying and providing performance metric information from a client computing device.
Figure 4:
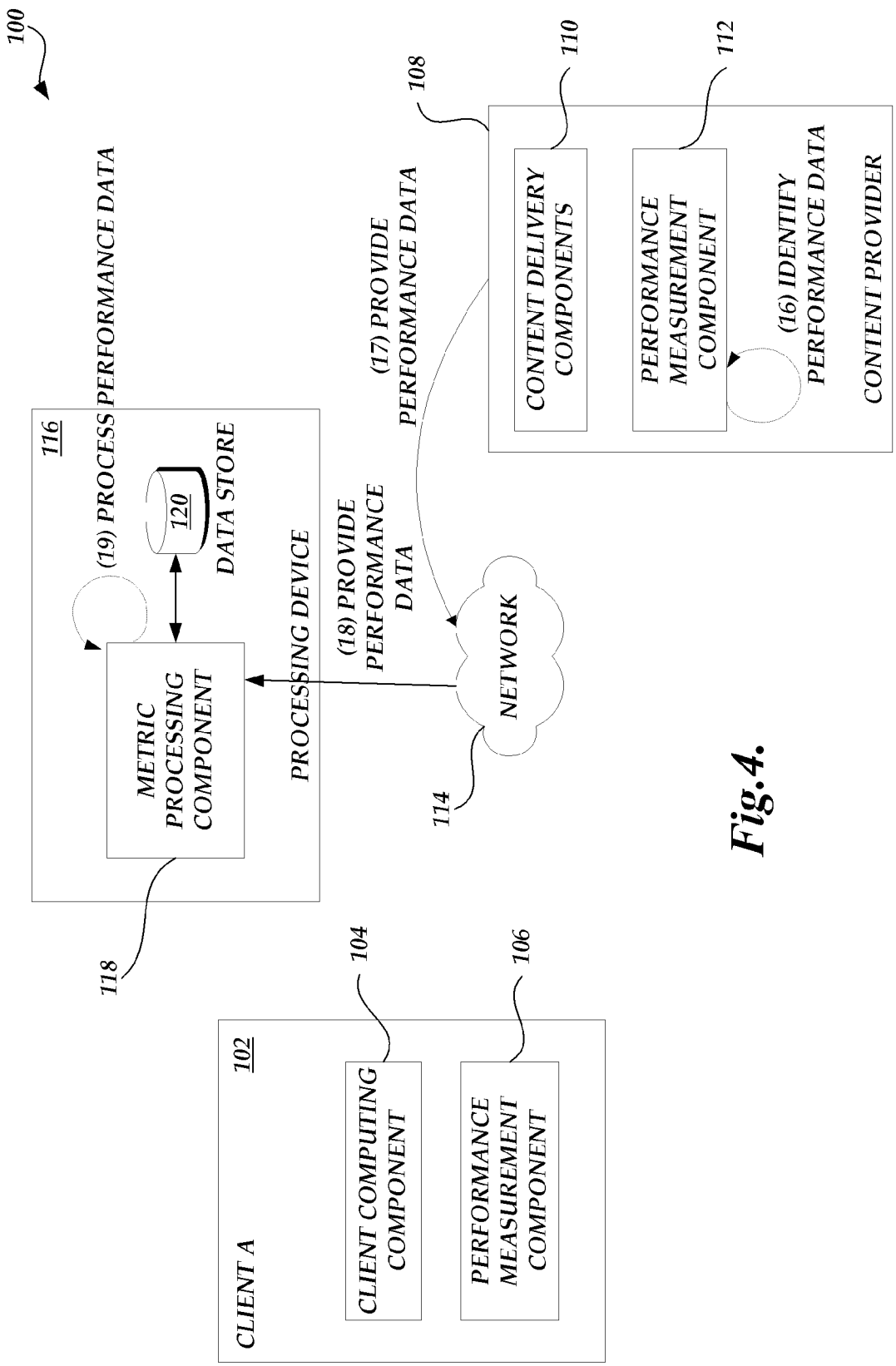
FIG. 4 is a block diagram of the performance measurement system of FIG. 1 illustrating the process of identifying and providing performance metric information from a content provider.

With reference now to FIGS. 2-4, an illustrative example of the operation of the performance monitoring system 100 according to some embodiments will be described. For purposes of the example, however, the illustration has been simplified such that many of the components utilized to facilitate communications are not shown. One skilled in the relevant art will appreciate that such components may be utilized and that additional interactions would accordingly occur without departing from the spirit and scope of the present disclosure.

With reference to FIG. 2, a client computing component 104 initiates a content request that is intended to ultimately be received and processed by the content provider 108. In an illustrative embodiment, the requested content may correspond to a Web page that is displayed on the client computing device 102 via the processing of a base set of information, such as hypertext markup language ("HTML"), extensible markup language ("XML"), and the like. The base set of information may also include a number of embedded resource identifiers that corresponds to resource objects that should be obtained by the client computing device 102 as part of the processing of the requested content. The embedded resource identifiers may be generally referred to as resource identifiers or resource URLs. The request for the base set of information and the subsequent request(s) for any embedded resources may be referred to generally as a "resource request."

In one embodiment, prior to initiating a resource request, the client computing component 104 associates a record identifier with the resource request. As will be described further below, the record identifier may be used to track performance metrics associated with processing the requested resource including any embedded resources. In one example, the record identifier may be attached to the resource request as a header or otherwise embedded in the request. The client computing component 104 then transmits the resource request with the record identifier. However, as will also be described further below, the client computing component 104 may alternatively transmit the associated record identifier in a separate transmission from the resource request.

It will be appreciated by one skilled in the relevant art and others that the client computing component 104 may generate the resource request and associated record identifier itself or receive one or the other or both from another storage or computing device. For example, another computing device, such as processing device 116, may be used to determine whether a test to monitor performance metrics associated with processing a particular resource, such as a Web page, should be conducted. In this example, the processing device 116 may send the test request, which includes a resource identifier corresponding to the desired resource request and a record identifier further associated with the resource identifier, to the client computing device 102.

In one illustrative embodiment, as shown in FIG. 2, the client computing component 104 initiates the content request by transmitting the resource identifier and associated record identifier directly or indirectly to the performance measurement component 106 of the client computing device 102. However, it will be appreciated by one skilled in the relevant art that, in the alternative, the performance measurement component 106 can otherwise intercept the content request initiated by the client computing component 104.

Continuing with the present example and in further reference to FIG. 2, the performance measurement component 106 receives the resource request and forwards the resource request on to the content provider 108 via communication network 114. Thereafter, the performance measurement component 106 continually monitors performance metrics associated with the processing of the requested resource, including any embedded resources. Specifically, in one illustrative embodiment, the performance measurement component 106 monitors network level performance metrics associated with the processing of the requested resource and any embedded resources, such as timing of receipt of the first and last bytes (or packets) of data of each request. The performance measurement component 106 can either obtain such performance metric information directly from the operating system of the client computing device 102 or through the client computing component 104. The performance measurement component 106 associates the monitored performance metrics with the record identifier.

As further illustrated in FIG. 2, the content provider 108 receives the resource request from the client computing device 102 and processes the resource request using content delivery components 110, such as a Web server. The content provider 108 can also use a performance measurement component 112 to monitor performance metrics associated with processing the incoming client request, identifying/obtaining the requested resource, and initiating the transmission of the resource responsive to the client request. As shown in FIG. 2, upon obtaining the requested resource, the content provider 108 initiates transmission of the requested resource to the client computing device 102.

In this illustrative example, the performance measurement component 106 at the client computing device 102 obtains the requested resource, continues monitoring the processing of the requested resource, and forwards the requested resource to the client computing component 104. For example, the performance measurement component 106 may serve as a proxy application for receiving the requested resource or otherwise intercepting the requested resource. The client computing component 104 also tracks performance metrics associated with the processing of the requested resource. Upon receipt of the requested resource, the client computing component 104 begins processing the content. For example, the client computing component 104 can process the content for display on a monitor or other display device associated with the client computing device 102. Alternatively, the client computing component 104 can process the content for sending to any other component or external device (e.g., a framebuffer). Performance metrics associated with processing the content for display once the content has been received at the client computing device 102 may also be collected. As will be further described below, the above described functions apply to the processing of the originally requested resource, as well as any embedded resources.

With reference now to FIG. 3, the client computing component 104 and the performance measurement component 106 of the client computing device 102 can each identify performance metric information that the respective components have monitored and/or collected. The performance metric information from the client computing component 104 may include a variety of information, such as process information, memory information, network data, resource data, client computing component information, including page setups, browser rendering information, state variables, display information, and other types of information. In one specific example, the performance metric information may include information regarding a time at which a particular resource was rendered on a Web page, its location on the page, whether the resource was rendered on the device display, and the like. The performance metric information from the performance measurement component 106 of the client computing device 102 can also include a variety of information as similarly set forth generally above. In one specific example, the performance metric data may include network statistics, latencies, bandwidths, and data arrival times, such as the timing of receipt of first and last packets of information for the requested resource including for each embedded resource. In another specific example, the performance metric information can include timing information associated with processing executable resources, such as JavaScript, as well as additional information that can be used to indirectly determine processing times associated with the execution of the resource once the executable code has been obtained.

The performance metric information from the client computing component 104 and/or the performance measurement component 106 of the client computing device 102 can also include basic resource information, such as an identification of the resource type, a link to a header associated with the requested resource, a size of the resource, including a size of the header as well as a size of a payload corresponding to the actual requested resource, an identification of a domain from which the resource was requested, and the like. For example, the performance metric information can include identification of a set of coordinates for each of the resources in order to define a resource display location associated with each of the resources. The set of coordinates can, for instance, include x- and y-coordinates identifying bounding corners of a display area corresponding to a location at which a resource is to be rendered. It will be appreciated by one skilled in the relevant art and others, however, that a resource display location can be identified in a variety of ways.

Even further, the performance metric information can include underlying computer resource information, such as a resolution of the display of the client computing device 102, a version of the browser application software, an identification of any plugins associated with the browser application software, an identification of any updates to the operating system of the client computing device 102, and the like. The performance metric information can also include identification of a display location (or area) associated with a visible portion of a display, also referred to herein as a frame, as will be discussed in further detail below. Alternatively, the performance metric information can include other display information from which such a display location can be inferred. Even further, the performance metric information can include information regarding the location of the client device 102 (such as an IP address), servers associated with the content provider 108, and/or servers associated with a service provider 122 (e.g., for a CDN service provider 124, a CDN service provider DNS nameserver or assigned cache server).

Still further, the performance metric information can include an identification of limitations and/or restrictions associated with processing resource requests using client computing device hardware and/or software. For example, the performance metric information can include identification of a threshold number (e.g., a maximum, a minimum, a range, and the like) of simultaneous connections to a domain. As another example, the performance metric information can include identification of an order associated with initiating embedded resource requests.

With continued reference to FIG. 3, the client computing component 104 and the performance measurement component 106 of the client computing device 102 provide the identified performance metric information together with the associated record identifier of the requested resource to the metric processing component 118 of the processing device 116 via the communication network 114. The metric processing component 118 then processes the received performance metric information to assess performance related to the processing of the client request for the original resource and any embedded resources. The processed performance metric information can be used to support modifications to the original resource and/or embedded resources to improve performance for subsequent client requests for the original resource. As will be appreciated by one skilled in the art and others, the processing device 116 can store the received and/or processed performance metric information in local data store 120, or any other data store distributed across the network 114. Additionally, as will be further described below in reference to FIGS. 7 and 9, the processing device 116 can cause the display of the processed performance metric information to a user of the system 100 for further assessment.

In one illustrative embodiment, once the client computing component 104 completes processing of the requested resource including any embedded resources, the client computing component 104 identifies performance metric information that the client computing component 104 monitored and/or otherwise collected related to such processing. In this example, the client computing component 104 provides the identified performance metric information with the record identifier associated with the requested resource to the metric processing component 118. Upon receipt of this information, the metric processing component 118 then requests any further performance metric information related to the requested resource and any embedded resources from the performance measurement component 106 of the client computing device 102. In response, the performance measurement component 106 of the client computing device 102 identifies and provides performance metric information with the record identifier associated with the requested resource to the metric processing component 118. The metric processing component 118 can use the record identifier to aggregate the received performance metric information. It will be appreciated by one skilled in the art and others that the identified performance metric information may be transmitted to the metric processing component 118 by a number of alternative methodologies and/or components.

In another illustrative embodiment, and as will be described further below, the metric processing component 118 can use the processed performance metric information associated with the original resource and any embedded resources to dynamically determine an additional or alternative service provider, such as CDN service provider 124, storage service provider 126, application service provider 128, or the like, for hosting or processing at least a portion of the original resource and/or any embedded resources to improve performance. As will also be further described below, in making such a determination, the metric processing component 118 can further take into consideration performance metric information collected and associated with subsequent resource requests for the original resource and any embedded resources using such alternative service providers, as well as performance selection criteria which can be obtained from the original content provider.

With reference now to FIG. 4, in one illustrative embodiment, the performance measurement component 112 of the content provider 108 can identify performance metric information that it has collected related to the processing of the requested resource and/or any embedded resource. The performance measurement component 112 provides the identified performance metric information to the metric processing component 118 of the processing device 116 via communication network 114. As will be appreciated by one skilled in the art and others, the performance measurement component 112 of the content provider 108 can provide the performance metric information upon request from the processing device 116 or upon completing its processing of the requested resource. As will be described further below, the processing device 116 can then aggregate the performance metric information from all components for displaying, processing, storing, or otherwise assessing performance related to the processing of the requested resource.

In one illustrative embodiment, the metric processing component 118 processes the performance metric information received from some or all network components (e.g., client computing component 104, performance measurement component 106 of the client computing device 102, and/or performance measurement component 112 of the content provider 108, and the like) to assess performance related to the processing of the client request for the original resource and any embedded resources. As previously mentioned, the processed performance metric information can be used to support modifications to the original resource and/or embedded resources to improve performance for subsequent client requests for the original resource. For example, and as will be described further below in reference to FIG. 8, the metric processing component 118 can use the processed performance metric information associated with the original resource to dynamically identify a subset of the embedded resources which correspond to a display location (or area) associated with a visible portion of a display and to further assess performance related to the processing of the subset of embedded resources. As will also be described further below, but in reference to FIG. 10, the metric processing component 118 can also use the processed performance metric information to dynamically determine a resource configuration to be associated with the embedded resources to improve performance associated with subsequent requests for the content. In making such a determination, the metric processing component 118 can further take into consideration performance metric information collected and associated with subsequent resource requests for the content using such alternative resource configurations.

Figure 5:
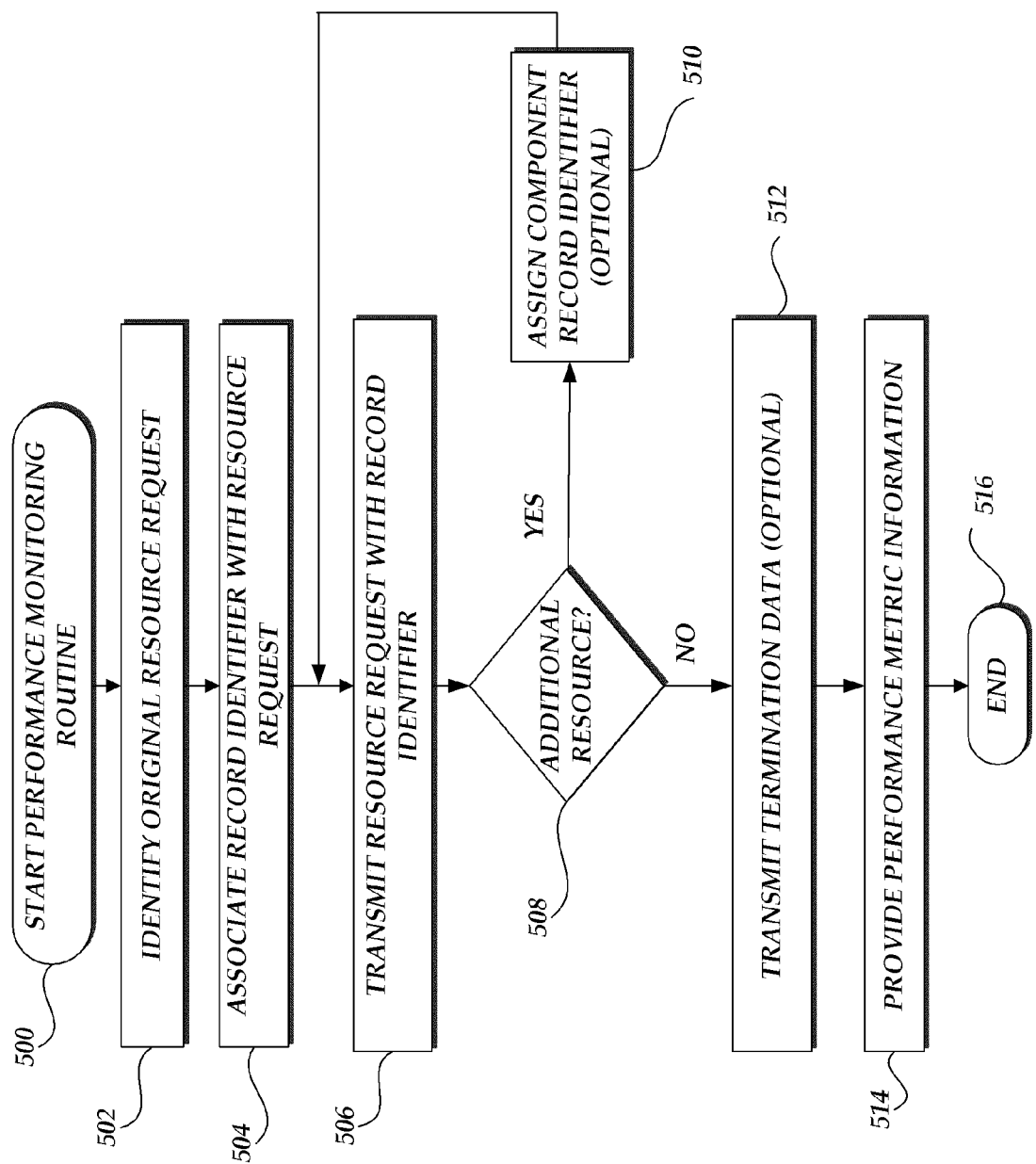
FIG. 5 is a flowchart illustrative of a performance monitoring routine implemented by a client computing device for monitoring the performance associated with resource requests made by the client computing device.

With reference now to FIG. 5, one embodiment of a performance monitoring routine 500 implemented by the client computing component 104 of the client computing device 102 will be described. One skilled in the relevant art will appreciate that actions/steps outlined for routine 500 may be implemented by one or many computing devices/components that are associated with the client computing device 102. Accordingly, routine 500 has been logically associated as being generally performed by the client computing device 102, and thus the following illustrative embodiments should not be construed as limiting.

At block 502, a client computing component 104 identifies an original resource request. As previously mentioned, the client computing component 104 can generate the original resource request or receive the original resource request from another computing device, such as processing device 116. In one example, the original resource request may be for a Web page, such as http://example.com. At block 504, the client computing component 104 associates a record identifier (RID) with the original resource request. The RID may be a unique identifier associated with the original resource request. As will be further described below, the RID can also be associated with any embedded resources included in a response to the original resource request. Even further, although not illustrated, in an alternative embodiment, in the event that the client computing component 104 does not need a RID, the client computing component 104 may not associate a RID with the resource request as shown at block 504.

At block 506, the resource request is transmitted to another entity. In this example, the resource request is transmitted to the performance measurement component 106 of the client computing device 102. As previously mentioned, the performance measurement component 106 can alternatively intercept the transmission request as it is being routed to a content provider 108 for example. In one illustrative embodiment, the resource request may itself contain the RID, such that the resource request and associated RID are transmitted as part of the same transmission. For example, the RID may be included as a portion of the resource URL used to request the resource. Alternatively or additionally, the RID may be transmitted in a second communication, either before or after the transmission including the resource request. For example, a "start new request group" command, including the RID may be issued before or after the initial resource request. In one further alternative embodiment, the client computing component 104 may not include a RID with the issuance of a "start new request group" command, and in this case, the performance measurement component 106 may generate, or otherwise obtain, such a RID upon receipt of the "start new request group" command.

Continuing at block 508, a determination is made at the client computing component 104 regarding whether any additional resources need to be requested to fulfill the original resource request. As appreciated by one skilled in the relevant art, a response to the original resource request may be returned to the client computing component 104 which includes a number of resource URLs corresponding to a number of embedded resources required to fulfill the original resource request. In one embodiment, if such additional resources are identified, processing returns to block 506 where the client computing component 104 transmits one or more requests for the identified embedded resources with the RID associated with the original resource request.

Alternatively or additionally, the client computing component 104 may assign a component record identifier (CRID) to each request for an embedded resource at optional block 510. In this example, when processing returns to block 506, the client computing component 104 may transmit the one or more embedded resource requests with the respectively assigned CRIDs. In an illustrative embodiment, the requests for embedded resources may be transmitted with respective CRIDs alone or together with the RID of the original resource request. As embedded resource requests (or component requests) are fulfilled, the returned content is processed by the client computing component 104. It will be appreciated by those skilled in the art and others that a response to an embedded resource request may include links to further embedded resources. As such, the functionality associated with blocks 506-510 may be repeated as described above until no resource requests are outstanding and no more additional resources need to be requested.

It will be appreciated by one skilled in the relevant art that resource requests are processed by the client computing device 102 in accordance with logic associated with the particular configuration of the browser software application. For example, the browser software application may be limited by a number of resource requests that may be made at one time, an order associated with the type of requests that may by made, an order based on a predetermined location for the requested resources on a display screen, or other limitations provided in the requested base resource.

Once the client computing component 104 determines at block 508 that no additional resources need to be obtained to fulfill the original resource request or any subsequent embedded resource request, processing can continue at optional block 512. At block 512, a termination command, such as "end new request group", may be transmitted to indicate that the request, including requests for all embedded resources, has completed. Such a termination command may provide closure to a "start new request group" command, if one were issued as part of the first iteration of block 506. In this example, the start/termination commands may be received and used by the performance measurement component 106 to determine which requested resources are associated with a particular originally requested resource.

At block 514, once the client computing component 104 has completed processing the requested original resource and any embedded resources, the client computing component 104 provides monitored performance metric information to processing device 116. The client computing component 104 monitors such performance metric information throughout the processing of the original resource request from initiation of the original resource request to final rendering of the requested resource and any embedded resources. The performance metric information can include, for example, timing data associated with the initiation of each request, receipt of a response to each request, and rendering of each requested resource, as well as other information as described herein. The routine 500 ends at block 516.

Figure 6:
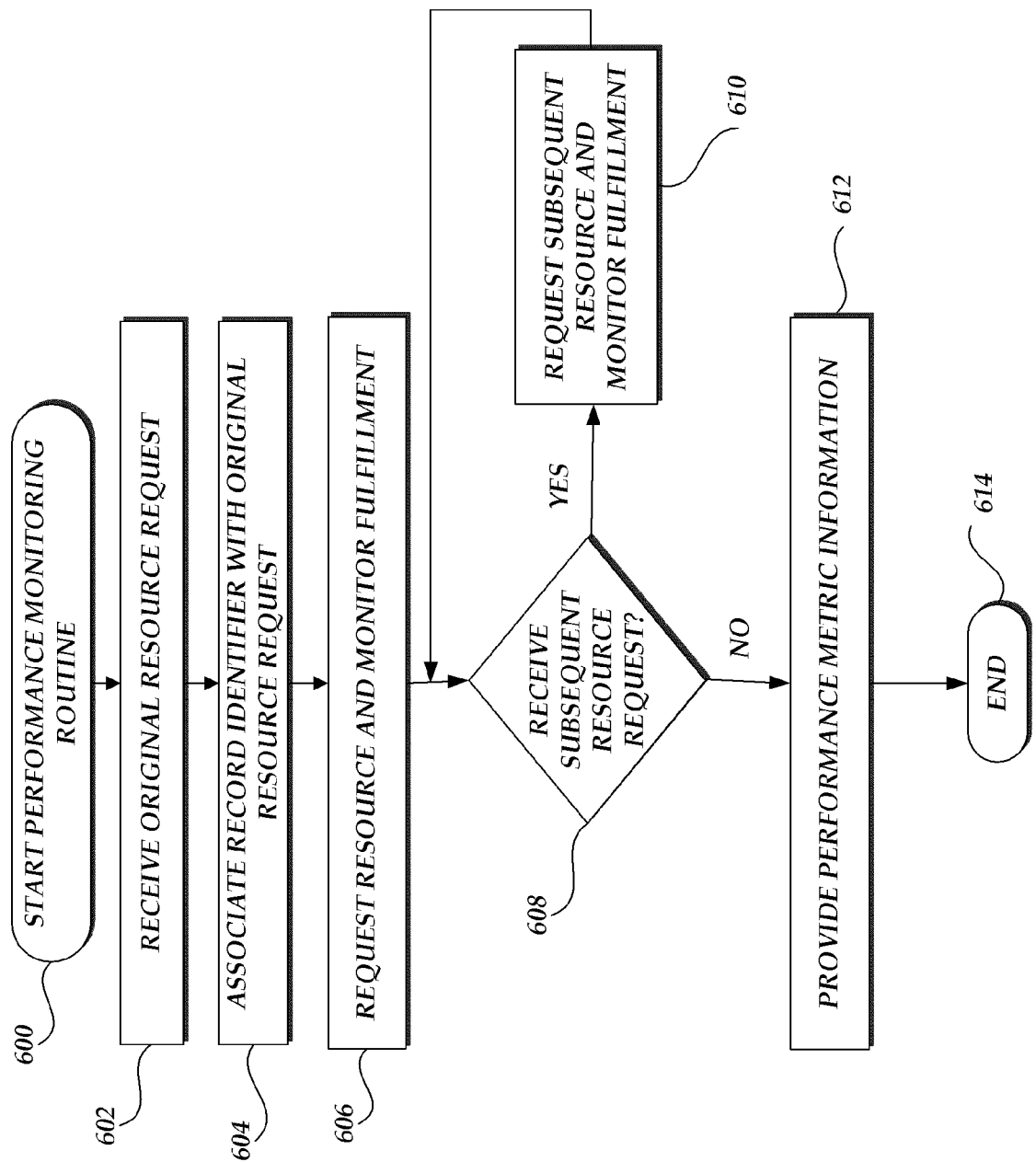
FIG. 6 is a flowchart illustrative of a performance monitoring routine implemented by a performance measurement component for further monitoring client side performance associated with resource requests made by the client computing device.

With reference now to FIG. 6, one embodiment of a performance monitoring routine 600 implemented by the performance measurement component 106 of the client computing device 102 will be described. One skilled in the relevant art will appreciate that actions/steps outlined for routine 600 may be implemented by one or many computing devices/components that are associated with the client computing device 102. Accordingly, routine 600 has been logically associated as being generally performed by the client computing device 102, and thus the following illustrative embodiments should not be construed as limiting.

At block 602, the performance measurement component 106 of the client computing component 100 receives (or intercepts) an original resource request from the client computing component 104. In one illustrative embodiment, the performance measurement component 106 receives the RID with the original resource request. Alternatively, the RID may be provided as a part of a separate transmission, and accordingly, in this case, the performance measurement component 106 receives the RID separately. At block 604, the performance measurement component 106 associates the RID with the original resource request. In accordance with other embodiments discussed above, the original resource request may be preceded or followed by a command or instructions, such as a "start new request group" command. Such commands may be transmitted with or without a RID, as set forth above. If such commands are received at the performance measurement component 106 without a RID, the performance measurement component may generate, or otherwise obtain, a RID to associate the original resource request at block 604.

Continuing at block 606, the original resource may be requested, such as by proxying or forwarding the resource request to the content provider 108 via network 114. The resource request may be modified from its original form before sending, such as by stripping headers including the associated RID. The performance measurement component 106 also monitors the processing, including fulfillment, of the resource request at block 606. For example, the performance measurement component can identify performance metric information related to the initiation of the resource request, the receipt of first and last bytes of data for each requested resource and any embedded resources, the receipt of responsive content, and the like. As will be appreciated by one skilled in the relevant art, once a response to the resource request is received at the performance measurement component 106, the response is returned to the requesting application.

At block 608, a determination is made by the performance measurement component 106 regarding whether a subsequent resource request related to the original resource request has been made by the client computing component 104 and accordingly received (or intercepted) by the performance measurement component. If a subsequent embedded resource request (which may bear the same RID as the original resource request, an appropriate CRID, and/or be within a start/stop command window) is received, processing continues at block 610. At block 610, the performance measurement component 106 requests any embedded resources and monitors the processing of the requested embedded resources as similarly described above in reference to the originally requested resource and block 606. The functionality associated with blocks 608-610 may be repeated as described above until no resource requests are outstanding.

If the performance measurement component 106 determines that no more outstanding resource requests remain at block 608, processing continues at block 612. Specifically, the performance measurement component 106 provides monitored performance metric information to processing device 116. The performance measurement component 106 monitors such performance metric information throughout the processing of the original resource request, from initiation of the original resource request to final rendering of the requested resource and any embedded resources. The performance metric information may include, for example, timing data associated with the initiation of each request, receipt of a response to each request, and receipt of first and last packets of data for each of the original resource request and any embedded resource requests, as well as other additional information as described herein.

In one illustrative embodiment, the performance measurement component 106 can identify performance metric information for providing to the processing device 116 in a variety of ways. For example, in one embodiment, the performance measurement component 106 can store performance measurement information in a log file together with identifiers to associate performance metric information with corresponding resource requests. In this example a set of requested resources may be joined by common RIDs, common CRIDs, associated CRID (e.g., where each component has a distinct CRID, but the distinct CRIDs of a single group have been associated or otherwise linked together, such as by a RID). In another illustrative embodiment, the performance measurement component can retrieve performance metric information from a log file based on timing information associated with a resource request. For example, a set of requested resources may be defined as the resources requested or fulfilled between a start command and an end command, or between an original resource request (inclusive) and a stop command. The routine 600 ends at block 614.

Figure 7:
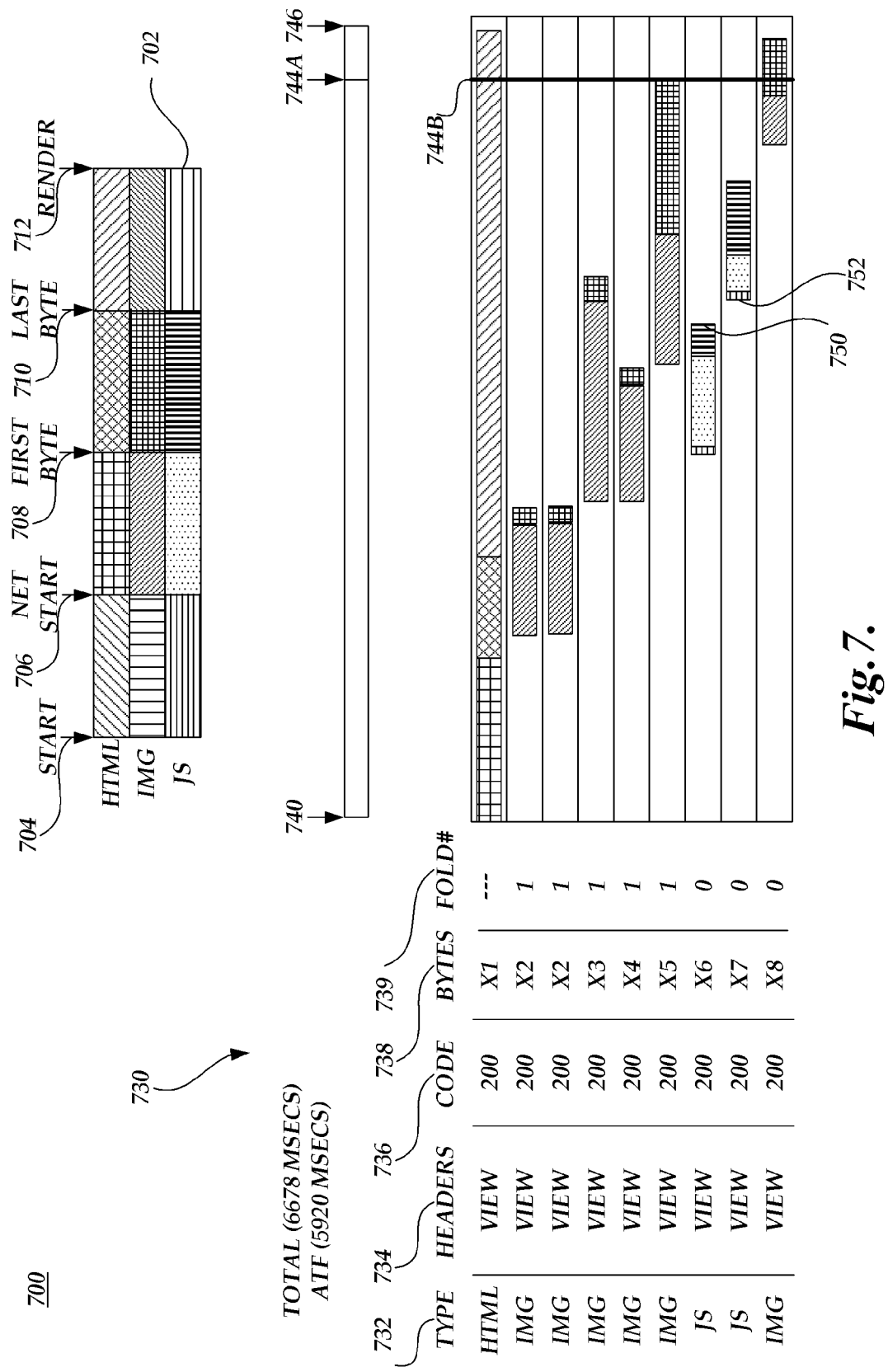
FIG. 7 is an illustrative user interface displaying a variety of performance metric information collected by the performance measurement system of FIG. 1.

With reference now to FIG. 7, an illustrative user interface 700 generated by the processing device 116 for displaying a variety of performance metric information collected, or otherwise identified, by the performance measurement system 100 of FIG. 1 will be described. Generally, the user interface 700 shown in FIG. 7 provides a graphical side-by-side comparison of the performance metric information identified for the originally requested resource and some or all requested embedded resources. The user interface 700 may also be provided over the network 114 for display on other computing devices.

With reference to FIG. 7, the user interface 700 may be utilized to display a set of time-based events for a set of resources. For example, the user interface 700 may graphically represent an order of time-based events for an originally requested resource and for each subsequent request for embedded resources. More specifically, the user interface 700 includes a legend 702 identifying, for a number of resource types, a graphical indicator corresponding to a number of time-based events 704, 706, 708, 710, and 712 involved in processing a request for the resource. The resource types identified in the legend 702 include HTML resources, image (IMG) resources, and JavaScript (JS) resources. However, it will be appreciated that a number of alternative or additional resource types can be identified. For each resource type, the legend 702 provides a distinct color-coded indicator corresponding to a transition period and/or transition event(s) occurring between each identified event 704, 706, 708, 710, and 712. In one embodiment, the distinct indicators may be visual in nature, such as color-coded, cross-hatched, or the like. In another embodiment, instead of using a distinct indicator for each transition period and/or transition event(s) associated with each resource type as illustrated in FIG. 7, a distinct indicator may be used simply for each transition period and/or transition event(s) regardless of the resource type.

In an illustrative embodiment, events 704, 706, 708, 710, and 712 correspond to the following time-based events identified by the performance metric information. Event 704 identifies a Start Event representing a time at which the corresponding resource was known to be required by the client computing component 104. Event 706 identifies a NetStart Event representing a time at which the corresponding resource was actually requested by the client computing component 104. The timing of the NetStart Event may not be the same as the Start Event if, for example, the browser software application limits the number of concurrent connections with a particular domain. Event 708 identifies a First Byte Event representing a time at which the first byte (or first packet) of the requested resource is received by the performance measurement component 106 of the client computing device 102. Event 710 identifies a Last Byte Event representing a time at which the last byte (or last packet) of the requested resource is received by the performance measurement component 106 of the client computing device 102. Finally, event 712 identifies a Render Event representing a time at which the client computing component 104 finishes rendering the requested resource. Render Event 712 can represent either a time of completing internal rendering of the resource to a framebuffer, for example, (which is an action performed by a browser), or external rendering to a display device, such as a monitor, (which is an action performed by a video card with the assistance of the operating system).

A second portion 730 of the user interface 700 corresponds to a representation illustrating the occurrence of each of the time-based events 704, 706, 708, 710, and 712 for all or some of the resources requested in resolving the original resource request. In one embodiment, the representation horizontally corresponds to time and vertically corresponds to an ordered listing of the requested resources. In one example, the order can specifically correspond to an order in which the requested resources are initially identified by the client computing component 104. In addition, the second portion 730 of the display includes a variety of additional information adjacent to the time-based event representation for each resource. For example, in a first column 732, a resource type for each resource may be provided, e.g., HTML, image, CSS, JavaScript, and the like. In a second column 734, a link to a header corresponding to each requested resource may be provided. In a third column 736, an HTTP response status code corresponding to each requested resource can be provided. Code 200, for example, is indicative of a standard response for successful HTTP requests. Finally, in a fourth column 738, the size of each resource may be provided.

The performance metric information provided in the user interface 700 may be identified and/or collected by a combination of the client computing component 104 and/or the performance measurement component 106 of the client computing device 102. However, it will be appreciated by those skilled in the art and others that additional performance metric information can be displayed. Such additionally displayed performance metric information can be obtained by the client computing device 102, by the performance measurement component 112 of the content provider 108, or based on further processing of any of the identified and/or collected performance metric information. It will yet further be appreciated by one skilled in the relevant art that each resource and/or each type of resource may be associated with all or only a portion of the above-described events and/or performance metric information. In addition, other events and/or indicators associated with the other events may be used and illustrated in the user interface 700.

In one specific example, an executable resource, such as a JavaScript resource, is not rendered and, accordingly, neither a Render Event 712 nor an associated indicator illustrating the transition between a Last Byte Event 710 and a Render Event 712 will be illustrated in the user interface 700 for that executable resource. However, the processing device 116 can indirectly determine and display a processing time associated with execution of the code once the code itself is obtained (i.e., receipt of the last byte of the code which corresponds to the Last Byte Event 710). Such processing time is inferred in the user interface 700 of FIG. 7 by illustration of a gap formed between the receipt of the last byte of code associated with a first JavaScript resource at 750 and the start event associated with a subsequently requested JavaScript resource at 752. Alternatively, an additional event and/or associated indicator could be used to specifically identify the processing time associated with execution of the code.

In another embodiment, yet further additional information may be displayed in the user interface 700. For example, the user interface 700 may display the total processing time, both numerically and graphically, associated with processing the original resource request including any embedded resource requests. In this example, an indicator 740 may illustrate a starting time while an indicator 746 may illustrate an ending time, both associated with the processing of the original resource request as a whole. Additionally, when the original resource request is a request for a Web page, the user interface 700 may illustrate a time, both numerically and graphically, at which all resources have been rendered in a portion of a Web page which is or which is to be initially visible to a user without scrolling. This portion of the Web page is often referred to as an "above the fold," "above the scroll," or "above the crease" portion. Indicators 744A and 744B in the user interface 700 of FIG. 7 illustrate an "above the fold" (ATF) event. A fifth column 739 is also provided to illustrate, in a binary manner, whether a corresponding embedded resource is considered to be located in an ATF portion of the display.

As will be described in further detail below, to identify an ATF event, the processing device 116 processes obtained performance data associated with an original resource request to identify a subset of embedded resources which correspond to a display location associated with a visible portion of a display. A variety of performance metric information may influence such identification. For example, a computing device may have a total available display area of 1280×1024 pixels, representing a height of 1280 pixels and a width of 1024 pixels. However, other characteristics or elements associated with a display may limit the area available to display content corresponding to a requested Web page. For example, a browser application or an operating system may allocate display space to other applications, controls, toolbars, and the like. As such, the total area (or number of pixels) available to display a given Web page may be something less than the full area of the display, e.g., 1000×1000 pi. For the purposes of this disclosure, as similarly set forth above, the display location (or area) associated with this available display area will be referred to as a frame.

In addition, the one or more resources associated with a given Web page may not all initially display in the 1000×1000 pi frame. Specifically, it is possible that only a certain subset of the resources associated with the Web page will be displayed in the frame and be immediately visible (without scrolling) to a user. In practice, a user may navigate to other non-displayed elements of the page by, e.g., use of scrollbars. By obtaining and processing the performance data as set forth above, the processing device 116 can identify timing information associated with the subset of resources to be rendered in the initially displayed frame. For example, the timing information can include each of the time-based events 704, 706, 708, 710, and 712 for each resource, as well as the ATF event 744A/744B which identifies a time associated with collectively rendering the subset of the resources to be located in the initial frame. As will be described further below, this timing information can be used to recommend resource configurations for improving performance of subsequent client requests for the content, and particularly for improving performance associated with rendering content in the initial frame.

Figure 8:
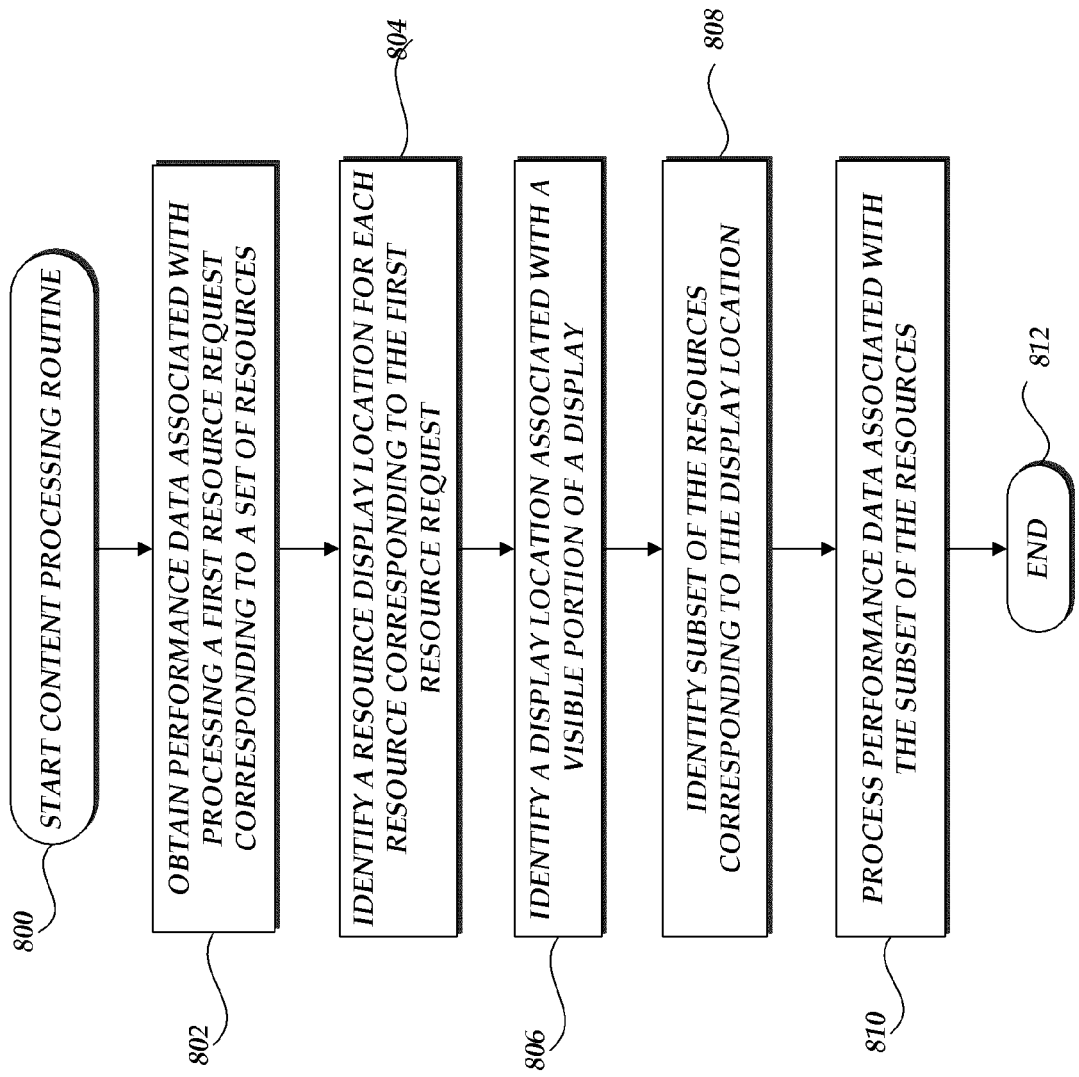
FIG. 8 is a flowchart illustrative of a content processing routine implemented by the processing device of the performance measurement system of FIG. 1 for identifying a subset of resources corresponding to an original resource request and processing performance data associated with the subset of the resources.

With reference now to FIG. 8, one embodiment of a content processing routine 800 implemented by the processing device 116 of the performance measurement system 100 will be described. One skilled in the relevant art will appreciate that actions/steps outlined for routine 800 may be implemented by one or many computing devices/components that are associated with the processing device 116. Accordingly, routine 800 has been logically associated as being generally performed by the processing device 116, and thus the following illustrative embodiments should not be construed as limiting.

At block 802, the processing device 116 obtains performance data associated with processing a first resource request corresponding to a set of resources. The performance data is obtained, for example, from client computing device 102, content provider 107, or other computing components via network 114 as described above. In addition, the performance data may include a variety of performance metric information associated with processing of the first resource request as also described in detail above. Next, at block 804, the processing device 116 identifies a resource display location for each resource corresponding to the first resource request based on the performance data. In one example, the resource display location for each resource is defined by a set of coordinates corresponding to each of the resources. The set of coordinates can, for instance, include x- and y-coordinates identifying bounding corners of a display area corresponding to a location at which a resource is to be rendered on a display. It will be appreciated by one skilled in the relevant art and others, however, that a resource display location can be identified in a variety of ways.

At block 806, the processing device 116 also identifies a display location, or area, associated with a visible portion of a display based on the performance data. The visible portion of the display may be defined by the entire area of the initially displayed frame of content. This first frame of data is associated with all resources to be collectively displayed at a given time. Identification, or estimation, of this display location may be determined automatically by the processing device 116 based on the performance data, such as the display resolution or a marker identified in the HTML code corresponding to a last image designated to be rendered above the fold.

Alternatively, the visible portion of the display may correspond to an area less than the entire initially displayed frame area. Identification of this display location may be based on performance selection criteria provided by a content provider. For example, a content provider may be interested in evaluating and/or improving performance associated with content that is associated with a particular area that is smaller than the initially displayed frame. For example, if a content provider consistently provides content designated as having a higher degree of importance in the same location on the initial frame, the content provider may identify this smaller area as the particular display location to be evaluated.

Next, at block 808, the processing device 116 identifies a subset of the resources corresponding to the identified display location associated with the visible portion of the display. In one embodiment, the subset of resources are identified by determining, for each resource, whether the resource display location corresponding to the resource is located within the identified display location. If so, the resource is designated as being included in the subset of the resources. The processing device 116 then processes the obtained performance data associated with the identified subset of the resources at block 810. In one embodiment, the processing device 116 processes the performance data to identify timing information associated with the subset of the resources. This timing information may include, for example, a time of receipt, at the client computing device, of the first byte of data and a time of receipt of the last byte of data for each resource specifically in the subset of resources. The timing information may also include timing information associated with rendering each resource in the subset of resources. In addition or alternatively, the timing information may also include timing information associated with collectively rendering the subset of the resources, such that the ATF event 744 as illustrated in FIG. 7 may be identified. As will be further described in reference to FIG. 10, the processed performance data associated with the subset of the resources, including but not limited to the identified timing information, can be used to improve performance associated with downloading and/or rendering the corresponding content. The routine ends at block 812.

Returning to FIG. 7, by providing and displaying the foregoing processed performance data as set forth above, a user of the processing device 116 can readily evaluate the performance associated with processing the originally requested resource, including any embedded resources. In particular, the user interface 700 can help a user identify any problems associated with the processing of the originally requested resource, as well as determine one or more solutions to the identified problem. Solutions for improving performance may include, for example, making changes to the content itself, to the organization of content within the originally requested resource, to the client computing component, and the like. For example, a solution for improving performance may include a suggestion to change the order in which resources for a given Web page are requested so that resources located in the initially displayed frame are requested prior to other resources. Other example solutions for improving performance specifically associated with processing a subset of resources that are to be rendered in the initially displayed frame, as will be further discussed below, include consolidating resources, using a different allocation of domains for processing the resources, using a CDN service provider to host the resources to be located in the frame, and the like.

Additionally, in further reference to FIG. 7, the user interface 700 can be used to illustrate a recommendation associated with the processed performance data. For example, and as will be described further below, the processing device 116 may dynamically identify one or more resource configurations to be utilized in conjunction with processing a subsequent request corresponding to the content associated with the original request and initiate testing of the subsequent request. As similarly set forth above with respect to the original base resource request, the user interface 700 can be used to display performance metric information associated with the processing of each of these subsequent requests. In addition, the user interface 700 can be used to display a recommendation identifying a particular resource configuration which, for example, has been tested and demonstrated improved performance associated with processing the requested resources.

Figure 9:
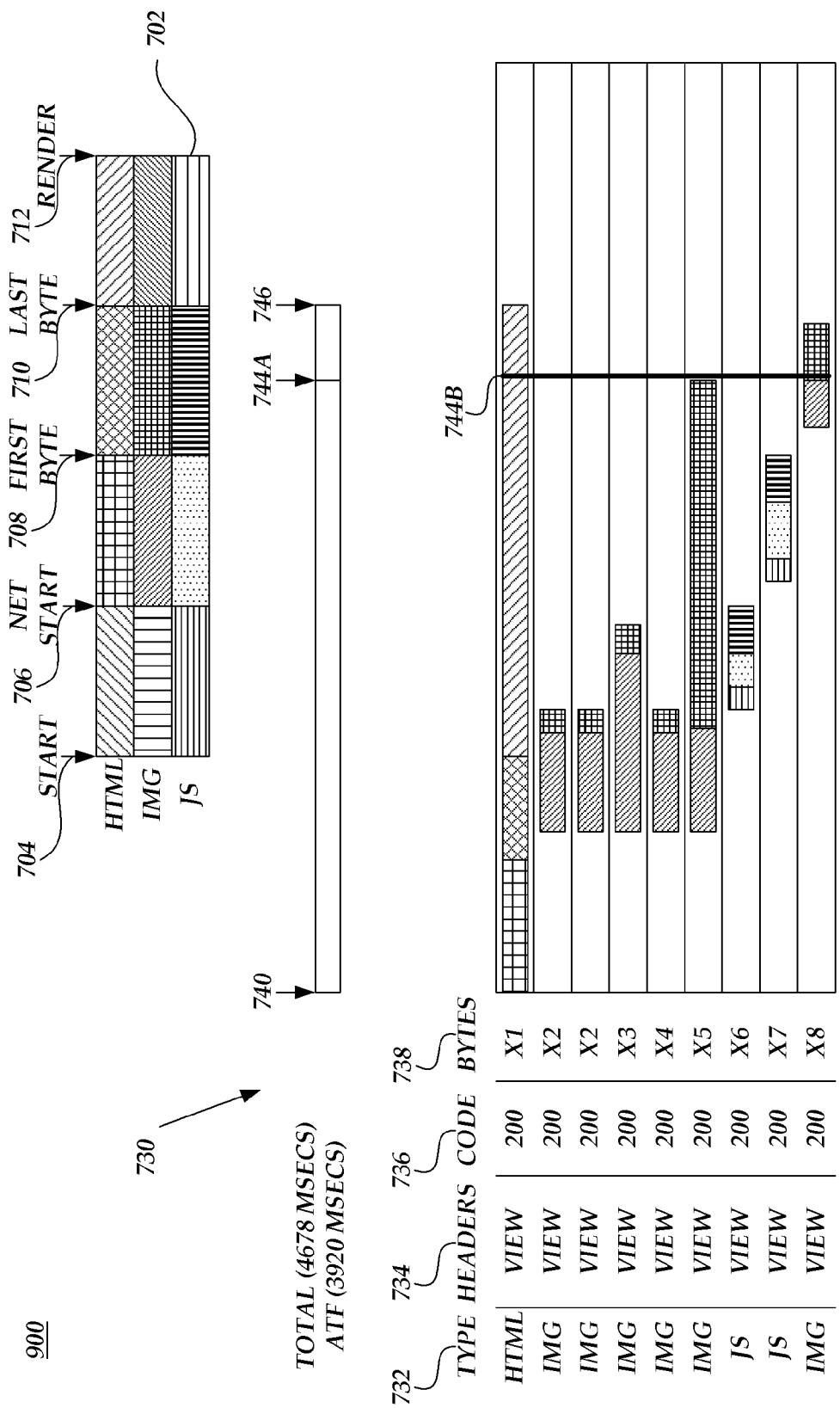
FIG. 9 is another illustrative user interface displaying a variety of performance metric information collected by the performance measurement system of FIG. 1.

With reference now to FIG. 9, a user interface 900 illustrates the performance associated with processing a subsequent request for the content associated with the original and embedded resources originally requested in reference to FIG. 7. Given that the basic features of the user interface 900 illustrated in FIG. 9 are similar, if not identical, to those illustrated in FIG. 7, like reference numerals have been retained. In this illustrative embodiment, an alternative resource configuration is utilized in conjunction with the subsequent resource request. The alternative resource configuration, in this example, provides for a different allocation of domains from which the subset of resources in the initial frame are requested. In particular, the alternative resource configuration provides for resources in the initial frame to be requested simultaneously by the client computing device 102. As illustrated by a comparison of the performance information illustrated in FIGS. 7 and 9, the use of the alternative resource configuration improved performance associated with processing a request for the desired content in this instance. This result is demonstrated by the overall reduced processing time associated therewith, as well as the overall reduced processing time for rendering the subset of resources located in the initial frame. The user interfaces illustrated in FIGS. 7 and 9 can also be provided to the content provider along with a specific recommendation, for example, to consider using the alternative resource configuration associated with FIG. 9 in order to improve performance.

It will be appreciated by one skilled in the relevant art and others that a number of factors may affect performance associated with processing a resource request and, accordingly, using an alternative resource configuration may not always improve performance. Factors that can be considered in determining whether a resource configuration will improve performance include, for example, a number of embedded resources corresponding to the original resource request, a size associated with each of the embedded resources, a total or effective bandwidth over which the request is made and resource is returned, a threshold number of simultaneous connections to a domain, a total number of simultaneous connections regardless of domain, an order of requesting the embedded resources, network architecture and topology, and the like.

With respect to these and other factors, it may be possible to associate the factor's influence on performance to predict the expected result that the combination of that factor will have with respect to changing the resource configuration used. However, it may not always be possible to predict the influence the combination of factors will have with respect to changing the resource configuration used. Because such factors may influence the overall processing performance associated with a request for an original resource and corresponding embedded resources, the determination of a resource configuration that achieves the best or desired level of performance for a particular resource request will be analyzed by a review of the performance information resulting from the associated test cases. Accordingly, in one embodiment, the determination of a resource configuration associated with a resource request may be a function of the overall performance information, which may inherently be a function of a combination of the above factors, for example.

Figure 10:
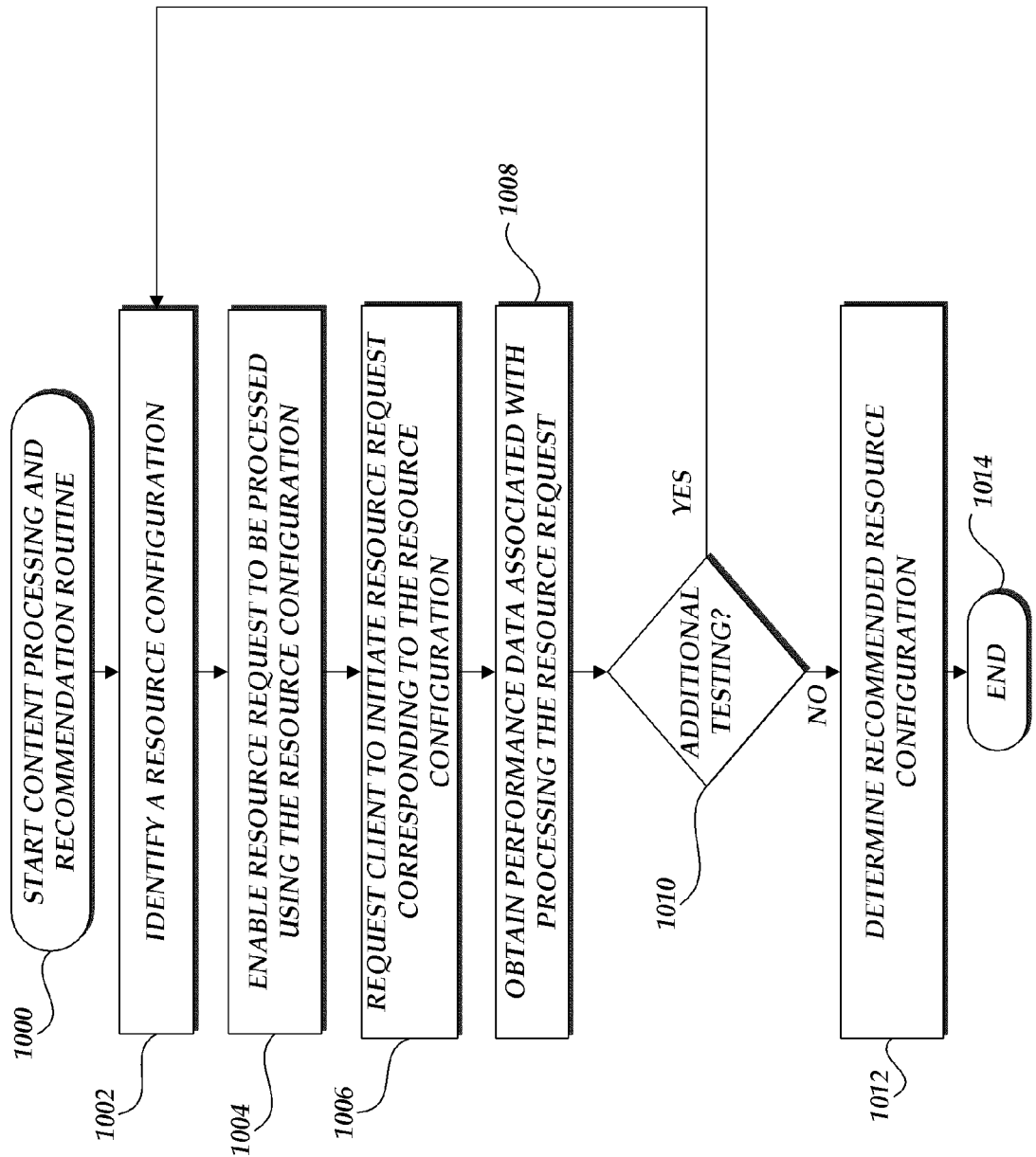
FIG. 10 is a flowchart illustrative of a content processing and recommendation routine implemented by the processing device of the performance measurement system of FIG. 1 for processing a resource request corresponding to a set of resources and determining a recommended resource configuration for the set of resources.

With reference now to FIG. 10, one embodiment of a content processing and recommendation routine 1000 implemented by the processing device 116 of the performance measurement system 100 will be described. One skilled in the relevant art will appreciate that actions/steps outlined for routine 1000 may be implemented by one or many computing devices/components that are associated with the processing device 116. Accordingly, routine 1000 has been logically associated as being generally performed by the processing device 116, and thus the following illustrative embodiments should not be construed as limiting.

At block 1002, the processing device 116 identifies a resource configuration to be utilized to process a request for content associated with a set of resources. The resource configuration may include an identification of one or more solutions, alone or in combination, for improving performance including, but not limited to, configuration data associated with consolidating resources, using a different allocation of domains for processing resources, using a service provider to host, process and/or enable transmission of at least a portion of the resources to be located in a visible portion of a display, and the like.

The processing device 116 can take into consideration a variety of information for identifying a resource configuration. For example, in one embodiment, the processing device 116 can receive a request from a content provider to test a specifically identified resource configuration in order to assess performance associated with processing the resource request using the identified resource configuration. In another embodiment, the processing device 116 can dynamically identify, based on previously processed performance metric information associated with a first request for a set of resources, a resource configuration that could be used to process a subsequent request corresponding to the content associated with the set of resources and to possibly offer improved performance. Alternatively, in yet another embodiment, the processing device 116 may automatically decide to test, and hence identify, a resource configuration regardless of the assessed performance associated with processing the first resource request for the set of resources.

The processing device 116 can take into consideration a number of factors in identifying, for testing purposes, a resource configuration to be associated with two or more embedded resources. As similarly set forth above, such factors include, for example, a number of embedded resources corresponding to the original resource request, a size of the headers and payloads corresponding to each embedded resource, a total or effective bandwidth over which the request is made and resource is returned, a threshold number of simultaneous connections permitted to a domain, a total number of simultaneous connections regardless of domain, an order of requesting the embedded resources, a location associated with each of the embedded resources on a display screen, a display location associated with a visible portion of the display, network architecture and topology, and the like. In one illustrative embodiment, an order of requesting the embedded resources may be especially taken into consideration where processed performance data identifies that an embedded resource that is to be displayed in the initial frame is downloaded relatively late in the overall download process associated with all of the resources corresponding to the request.

In addition or alternatively, the processing device 116 can take into consideration a variety of other performance selection criteria. The performance selection criteria can include, for example, quality of service information, cost information associated with processing a resource request using a particular resource configuration, and the like. The quality of service information can include information regarding reliability, service level quality, transmission errors, and the like. Specifically, in one embodiment, the processing device 116 can obtain performance selection criteria from the content provider 108. The content provider 108 may want the processing device 116 to only test resource configurations which meet a minimum quality of service level or which would only cost a specified amount to implement. In another embodiment, the content provider 108 may have other performance criteria associated with a quality of service, such as wanting the processing device to only test resource configurations associated with a subset of the resources corresponding to a visible portion of a display.

At block 1004, once the processing device 116 identifies a resource configuration to use in processing a request corresponding to content originally associated with a set of resources, the processing device 116 enables the request to be processed using the identified resource configuration. Specifically, in one embodiment, the processing device 116 may reorganize the order or layout associated with the set of resources so that the subset of resources located in the initially displayed frame are prioritized over the remaining resources outside the frame. In another embodiment, the processing device 116 may consolidate select resources, particularly in the subset of the resources, to create one or more consolidated embedded resource files, such as one or more image files with corresponding CSS (Cascading Style Sheets) mappings. In yet another embodiment, the processing device may associate, for each resource in the set of resources or specifically in the subset of resources, a domain from which the associated resource will be requested. In still yet another embodiment, the processing device may determine configuration information for enabling the use of a service provider to host, process, and/or transmit one or more resources either from the set of resources or specifically from the subset of the resources corresponding to a visible portion of the display. The processing device 116 also determines any additional configuration information necessary for enabling the use of any one of the foregoing exemplary resource configurations.

Continuing at block 1006 of FIG. 10, the processing device 116 then initiates the resource request associated with content to be processed using the identified resource configuration by requesting that the client computing device 102 initiate the query. As similarly described above, the client computing device 102 monitors and collects performance data associated with the processing of the resource request and provides the performance data to the processing device 116. Accordingly, at block 1008, the processing device 116 obtains and processes the performance data from the client computing device 102. The obtained performance data is associated with the processing of the resource request using the resource configuration to provide the content associated with the corresponding set of resources.

Next, at block 1010, a determination is made whether any additional resource configurations should be used to process a request corresponding to the content associated with the set of resources and, accordingly, be tested to determine how the use of the additional resource configurations may affect the performance associated with processing such a request. If an additional resource configuration is to be identified, then processing returns to block 1002 and the foregoing process in reference to blocks 1002-1010 is repeated as described above. If no additional resource configuration is identified, processing continues at block 1012.

At block 1012, the processing device 116 dynamically determines a recommended resource configuration to be associated with the set of resources based on the obtained and processed performance data. Additionally or alternatively, the processing device 116 can take into consideration a number of factors in determining a recommended resource configuration. Again, as similarly set forth above, such factors include, for example, a number of embedded resources corresponding to the original resource request, a size of the headers and payloads corresponding to each embedded resource, a total or effective bandwidth over which the request is made and resource is returned, a threshold number of simultaneous connections permitted to a domain, an order of requesting the embedded resources, a location associated with each of the embedded resources on a display screen, a display location associated with a visible portion of the display, network architecture and topology, and the like.

Even further, the processing device may, additionally or alternatively, take into consideration performance selection criteria in the determination of a recommended resource configuration. As also similarly mentioned above, the performance selection criteria can be obtained from a content provider 108 and can include quality of service information, cost information, and the like. As also set forth above, the quality of service information can include information regarding reliability, service level quality, transmission errors, and the like. In one example, the processing device 116 can determine that a resource configuration corresponding to the best performance data is the determined resource configuration. Alternatively, a content provider 108 may not want to implement the best performing resource configuration for processing and/or transmitting content, but rather wants to consider a cost benefit analysis. For example, a content provider 108 may only want to consider implementing a resource configuration that attains a certain level of enhanced performance, such as those that meet a threshold decrease in processing time.

In addition to determining the resource configuration to be associated with the set of resources, the processing device 116 can also generate a recommendation identifying the determined resource configuration or provide an evaluation of all of the tested resource configurations together with a recommendation of the determined resource configuration. Such recommendations and/or evaluations can then be provided to the content provider 108. The processing device 116 can also generate and provide modified HTML code to the content provider for utilizing the determined resource configuration. The processing device 116 can also generate and provide any additional code necessary to implement the recommended resource configuration. The routine ends at block 1014.

It will be appreciated by those skilled in the art and others that while processing, monitoring, and other functions have been described herein as being performed at various components of the client computing device 102 and/or the processing device 116, these functions can be distributed across one or more computing devices. In addition, the performance metric information monitored at the client computing device 102 can be maintained globally by the client computing device 102 and shared with all or some subset of the components of the client computing device 102.

It will further be appreciated by those skilled in the art and others that all of the functions described in this disclosure may be embodied in software executed by one or more processors of the disclosed components. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for monitoring performance associated with processing a resource request, the system comprising:
   a processing component associated with a computing device operable to:
      obtain, from a client computing component, a first set of performance data associated with processing a first resource request, wherein the first resource request corresponds to a set of resources and wherein the set of resources corresponds to an original resource and any embedded resources associated with content requested by a client computing device;
      obtain, from a performance measurement component, a second set of performance data associated with processing the first resource request;
      identify one or more resource configurations to be utilized in conjunction with a subsequent resource request based on a display location associated with one or more resources in the set of resources, wherein the subsequent resource request corresponds to the content associated with the set of resources;
      for each resource configuration:
         cause an initiation of the subsequent resource request associated with the resource configuration; and
         obtain, from the client computing component and the performance measurement component, performance data related to processing of the subsequent resource request using the resource configuration; and
      dynamically determine a recommended resource configuration to be associated with the content corresponding to the set of resources based on the first and second sets of performance data and the performance data related to processing the subsequent resource request using each of the one or more resource configurations.

2. The system as recited in claim 1, wherein the processing component is further operable to generate code for the recommended resource configuration.

3. The system as recited in claim 1, wherein the display location is associated with a visible portion of a display.

4. The system as recited in claim 3, wherein the visible portion of the display corresponds to a portion of the display associated with all resources to be collectively displayed at a given time on the display.

5. The system as recited in claim 1, wherein identifying one or more resource configurations to be utilized in conjunction with a subsequent resource request is based on a display location associated with each resource in the set of resources.

6. The system as recited in claim 1, wherein identifying one or more resource configurations to be utilized in conjunction with a subsequent resource request is based on a display location associated with a subset of resources corresponding to the set of resources.

7. The system as recited in claim 6, wherein the subset of resources corresponds to resources to be rendered on a visible portion of a display.

8. The system as recited in claim 7, wherein identifying one or more resource configurations to be utilized in conjunction with a subsequent resource request is further based on timing information associated with the subset of the set of resources.

9. The system as recited in claim 8, wherein the timing information includes timing of receipt, at the client computing device, of the first byte of data and timing of receipt of the last byte of data for each resource in the subset of the resources.

10. The system as recited in claim 8, wherein the timing information includes timing information associated with rendering each resource in the subset of resources for display.

11. The system as recited in claim 8, wherein the timing information includes timing information associated with collectively rendering the subset of resources for display.

12. The system as recited in claim 8, wherein the timing information includes timing information associated with receipt of the first byte of data for each resource in the subset of the resources, receipt of the last byte of data for each resource in the subset of resources, rendering each resource in the subset of resources for display, and collectively rendering the subset of resources for display.

13. The system as recited in claim 1, wherein dynamically determining a recommended resource configuration, by the processing component, is based on timing information associated with a subset of the resources.

14. The system as recited in claim 13, wherein the subset of the resources are associated with a display location corresponding to a visible portion of a display on which the subset of resources are to be rendered.

15. The system as recited in claim 1, wherein at least one of the one or more resource configurations comprises configuration information corresponding to an order of requesting the set of resources, wherein the order of requesting the set of resources is different from an order of requesting the set of resources corresponding to the first resource request.

16. The system as recited in claim 1, wherein at least one of the one or more resource configurations comprises configuration information corresponding to an allocation of domains to be associated with the set of resources, wherein the allocation of domains is different from an allocation of domains corresponding to the first resource request.

17. The system as recited in claim 1, wherein at least one of the one or more resource configurations comprises a consolidation configuration identifying one or more sets of the set of resources to be consolidated.

18. The system as recited in claim 1, wherein at least one of the one or more resource configurations comprises configuration information corresponding to utilizing one or more network-based service providers to host or process the content on behalf of a content provider or enable transmission of the content.

19. A method comprising:
   identifying, by a processing device, one or more resource configurations to be utilized in conjunction with processing a request corresponding to a set of resources, wherein the set of resources corresponds to an original resource and any embedded resources associated with content requested by a client computing device;
   for each resource configuration:
      causing an initiation of a request corresponding to the set of resources, wherein the request is associated with the resource configuration; and
      obtaining performance data related to processing of the request using the resource configuration; and
   dynamically determining a recommended resource configuration to be associated with the set of resources based on the performance data.

20. The method as recited in claim 19, wherein obtaining performance data related to processing of the request using each of the one or more identified resource configurations comprises:
   obtaining, from a client computing component, performance data associated with a record identifier, wherein the performance data is associated with processing the request;
   obtaining, from a performance measurement component, performance data associated with a record identifier, wherein the performance data is associated with processing the request and includes timing information as to the receipt of the first and last bytes of data for each embedded resource associated with the request; and
   associating the performance data from the client computing component and the performance measurement component using the record identifier.

21. The method as recited in claim 19 further comprising generating a recommendation to use the determined resource configuration to process a subsequent request corresponding to the content associated with the set of resources.

22. The method as recited in claim 19 further comprising generating code for the content associated with the set of resources to be processed using the determined resource configuration.

23. The method as recited in claim 19, wherein identifying one or more resource configurations to be utilized in conjunction with a resource request is based on a display location associated with each resource in the set of resources.

24. The method as recited in claim 19, wherein identifying one or more resource configurations to be utilized in conjunction with a resource request is based on a display location associated with a subset of resources corresponding to the set of resources.

25. The method as recited in claim 24, wherein the subset of resources corresponds to resources to be rendered on a visible portion of a display.

26. The method as recited in claim 25, wherein identifying one or more resource configurations to be utilized in conjunction with a resource request is further based on timing information associated with the subset of resources.

27. The method as recited in claim 26, wherein the timing information includes timing of receipt, at the client computing device, of the first byte of data and timing of receipt of the last byte of data for each resource in the subset of resources.

28. The method as recited in claim 26, wherein the timing information includes timing information associated with rendering each resource in the subset of resources for display.

29. The method as recited in claim 26, wherein the timing information includes timing information associated with collectively rendering the subset of resources for display.

30. The method as recited in claim 26, wherein the timing information includes timing information associated with receipt of the first byte of data for each resource in the subset of resources, receipt of the last byte of data for each resource in the subset of resources, rendering each resource in the subset of resources for display, and collectively rendering the subset of resources for display.

31. The method as recited in claim 25, wherein at least one of the one or more resource configurations comprises configuration information corresponding to an order of requesting the set of resources.

32. The method as recited in claim 25, wherein at least one of the one or more resource configurations comprises configuration information corresponding to an allocation of domains to be associated with the set of resources.

33. The method as recited in claim 25, wherein at least one of the one or more resource configurations comprises a consolidation configuration identifying one or more sets of the resources to be consolidated, wherein the one or more sets are selected from the subset of resources to be rendered on the visible portion of the display.

34. The method as recited in claim 25, wherein at least one of the one or more resource configurations comprises configuration information corresponding to utilizing one or more network-based service providers to host or process at least a portion of the content on behalf of a content provider or enable transmission of at least a portion of the content.

35. The method as recited in claim 19, wherein dynamically determining a recommended resource configuration is based on timing information associated with a subset of the resources.

36. The method as recited in claim 35, wherein the subset of the resources are associated with a display location corresponding to a visible portion of a display on which the subset of resources are to be rendered.

37. The method as recited in claim 36, wherein the recommended resource configuration comprises configuration information corresponding to an order of requesting the set of resources.

38. The method as recited in claim 36, wherein the recommended resource configuration comprises configuration information corresponding to an allocation of domains to be associated with the set of resources.

39. The method as recited in claim 36, wherein the recommended resource configuration comprises a consolidation configuration identifying one or more sets of the subset of resources to be consolidated.

40. The method as recited in claim 36, wherein the recommended resource configuration comprises configuration information corresponding to utilizing one or more network-based service providers to host or process at least a portion of the content on behalf of a content provider or enable transmission of at least a portion of the content.

41. The method as recited in claim 19, wherein the recommended resource configuration comprises at least two or more of: configuration information corresponding to an allocation of domains to be associated with the set of resources; configuration information corresponding to an allocation of domains to be associated with the set of resources; a consolidation configuration identifying one or more sets of the subset of resources to be consolidated; and configuration information corresponding to utilizing one or more network-based service providers to host or process at least a portion of the content on behalf of a content provider or enable transmission of at least a portion of the content.

42. The method as recited in claim 19, wherein dynamically determining a recommended resource configuration is further based on performance selection criteria.

43. The method as recited in claim 42, wherein the performance selection criteria includes quality of service information.

44. The method as recited in claim 42, wherein the performance selection criteria includes cost information associated with processing the request.

45. The method as recited in claim 19 further comprising obtaining, from a content provider, performance selection criteria.

46. The method as recited in claim 45, wherein dynamically determining a recommended resource configuration is further based on the performance selection criteria provided by the content provider.

47. A method comprising:
  obtaining, from a client computing device, performance data associated with processing a first resource request, wherein the first resource request corresponds to a set of resources, and wherein the set of resources corresponds to an original resource and any embedded resources associated with content requested by the client computing device; and
  dynamically identifying one or more resource configurations to be utilized in conjunction with processing a subsequent request corresponding to the content associated with the set of resources, wherein the one or more resource configurations to be utilized in conjunction with processing the subsequent request are different from a resource configuration utilized in conjunction with processing the first resource request.

48. The method as recited in claim 47, wherein obtaining performance data associated with processing the requested resource comprises:
  obtaining, from a client computing component, performance data associated with a record identifier, wherein the performance data is associated with processing the first resource request;
  obtaining, from a performance measurement component, performance data associated with a record identifier, wherein the performance data is associated with processing the first resource request and includes timing information as to the receipt of the first and last bytes of data for each resource associated with the request; and
  associating the performance data from the client computing component and the performance measurement component using the record identifier.

49. The method as recited in claim 47, wherein dynamically identifying one or more resource configurations to be utilized in conjunction with the subsequent request is based on the obtained performance data.

50. The method as recited in claim 47, wherein dynamically identifying one or more resource configurations to be utilized in conjunction with the subsequent request comprises processing the obtained performance data and dynamically identifying one or more resource configurations to be utilized in conjunction with the subsequent request if the processed performance data fails to meet a predetermined level of performance associated with a subset of the resources.

51. The method as recited in claim 50, wherein the subset of resources corresponds to resources to be rendered on a visible portion of a display.

52. The method as recited in claim 47, wherein dynamically identifying one or more resource configurations is based on timing information associated with a subset of the resources, wherein the subset of the resources corresponds to resources to be rendered on a visible portion of a display.

53. The method as recited in claim 47, wherein dynamically identifying one or more resource configurations is based on an estimated performance benefit.

54. The method as recited in claim 47, wherein identifying one or more resource configurations to be utilized in conjunction with a resource request is based on a display location associated with a subset of resources corresponding to the set of resources.

55. The method as recited in claim 54, wherein the subset of resources corresponds to resources to be rendered on a visible portion of a display.

56. The method as recited in claim 55, wherein at least one of the one or more resource configurations comprises configuration information corresponding to an order of requesting the set of resources.

57. The method as recited in claim 55, wherein at least one of the one or more resource configurations comprises configuration information corresponding to an allocation of domains to be associated with the set of resources.

58. The method as recited in claim 55, wherein at least one of the one or more resource configurations comprises a consolidation configuration identifying one or more sets of the resources to be consolidated, wherein the one or more sets are selected from the subset of resources to be rendered on the visible portion of the display.

59. The method as recited in claim 55, wherein at least one of the one or more resource configurations comprises configuration information corresponding to utilizing one or more network-based service providers to host or process at least a portion of the content on behalf of a content provider or enable transmission of at least a portion of the content.

60. The method as recited in claim 47, wherein dynamically identifying one or more resource configurations to be utilized in conjunction with the subsequent request is based on performance selection criteria.

61. The method as recited in claim 60, wherein the performance selection criteria includes quality of service information.

62. The method as recited in claim 60, wherein the performance selection criteria includes cost information associated with processing the subsequent request.

63. The method as recited in claim 47 further comprising obtaining, from the content provider, performance selection criteria, wherein dynamically identifying one or more resource configurations to be utilized in conjunction with the subsequent request is based on the obtained performance selection criteria.

64. The method as recited in claim 47 further comprising:
  for each of the one or more resource configurations:
    causing an initiation of the subsequent request corresponding to the content associated with the set of resources.

65. The method as recited in claim 64 further comprising:
  for each of the one or more resource configurations:
    obtaining performance data related to the processing the subsequent request associated with the resource configuration.

66. The method as recited in claim 65 further comprising providing a recommendation for processing a further subsequent resource request based on a comparison of the performance data associated with processing the first resource request with the performance data associated with processing the subsequent request using each of the identified one or more resource configurations, wherein the further subsequent resource request corresponds to the content associated with the set of resources.

67. The method as recited in claim 65 further comprising dynamically determining a recommended resource configuration to be associated with the set of resources based on the performance data associated with processing the subsequent request using each of the identified one or more resource configurations.

68. The method as recited in claim 67, wherein dynamically determining a recommended resource configuration is further based on the performance data associated with processing the first resource request.

69. The method as recited in claim 67, wherein dynamically determining a recommended resource configuration is further based on performance selection criteria.

70. The method as recited in claim 69, wherein the performance selection criteria includes quality of service information.

71. The method as recited in claim 69, wherein the performance selection criteria includes cost information associated with processing the subsequent request.

* * * * *